United States Patent [19]
Dias et al.

[11] Patent Number: 5,488,284
[45] Date of Patent: Jan. 30, 1996

[54] BATTERY CHARGER SYSTEMS AND METHODS

[75] Inventors: Donald R. Dias, Carrollton; Eric W. Mumper, Dallas, both of Tex.

[73] Assignee: Dallas Semiconductor Corporation, Dallas, Tex.

[21] Appl. No.: 953,906

[22] Filed: Sep. 30, 1992

[51] Int. Cl.$^6$ .............................. H01M 10/42; H02J 7/00
[52] U.S. Cl. .................................. 320/39; 320/30; 320/20
[58] Field of Search ................................. 320/20, 31, 32, 320/39, 40

[56] References Cited

U.S. PATENT DOCUMENTS

| | | | |
|---|---|---|---|
| 3,547,127 | 12/1970 | Anderson | 320/39 X |
| 3,925,714 | 12/1975 | Sherman, Jr. | 320/39 |
| 4,583,035 | 4/1986 | Sloan | 320/31 X |
| 4,609,861 | 9/1986 | Inaniwa et al. | 320/32 |

FOREIGN PATENT DOCUMENTS

| | | | |
|---|---|---|---|
| 1588279 | 6/1970 | Germany | 320/32 |
| 3509149 | 5/1986 | Germany | 320/32 |

*Primary Examiner*—Peter S. Wong
*Assistant Examiner*—Robert Nappi
*Attorney, Agent, or Firm*—Jenkens & Gilchrist

[57] ABSTRACT

A battery charger with varying applied voltage and varying series resistance invoked in response to battery charge level provides an optimizable multipart load line for charging. The multipart load line may be programmed into a memory within the battery charger, and thereby common design battery chargers may be configured with optimized multipart load lines for diverse batteries. Programming access can be over the charge current output terminal for both one-wire communication and programming high voltage for EPROM programming.

20 Claims, 33 Drawing Sheets

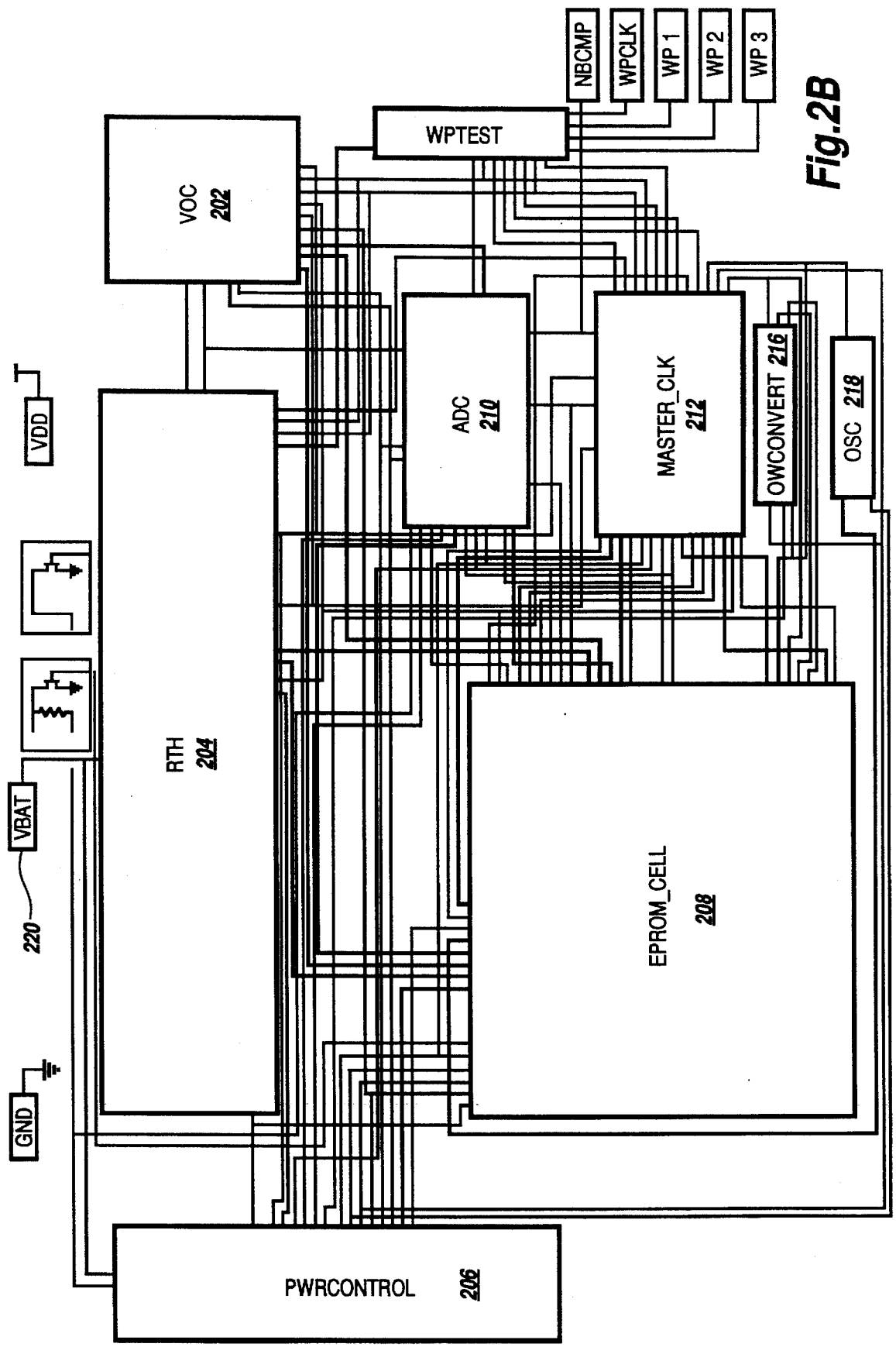

BATTERY CHARGER SYSTEMS AND METHODS

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork fights has no objection to the facsimile reproduction by anyone of the patent document or patent disclosure, as it appears in the United States Patent and Trademark Office patent file or records, but otherwise reserves all copyright and maskwork fights whatsoever.

BACKGROUND AND SUMMARY OF THE INVENTIONS

The present invention relates to electronic devices, and, more particularly, to devices useful for controlling battery charging.

Battery Chargers

The widespread use of battery-powered portable computers (e.g., notebooks, laptops and palmtops) with high performance relies on efficient battery utilization. In particular, portable computers typically use rechargeable batteries (e.g., lithium, nickel-cadmium, or nickel metal hydride) which weigh just a few pounds and deliver 4 to 8 volts. Such batteries provide roughly three hours of computing time, but require about as long to be recharged. Such slow recharging is a problem and typically demands that users have several batteries with some recharging while others are being used.

Known battery chargers apply a constant voltage across a discharged battery with the applied voltage determined by the maximum voltage acceptable by the battery. FIG. 1a heuristically illustrates such a battery charger with $V_{MAX}$ the maximum voltage acceptable by the battery and $I_{MAX}$ the maximum current; the resistor R and $V_{MAX}$ are the adjustable parameters. FIG. 1b is the load line for the battery charger of FIG. 1a and shows charging current I as a function of the battery voltage V. As the load line shows, the charging current begins at $I_{MAX}$ with a totally discharged battery as indicated by point A. The battery rapidly charges and its voltage increases and the charging current decreases with the operating point moving down the load line as shown by arrow B. Then as the battery voltage rises to near $V_{MAX}$, the charging current falls to zero as indicated by point C. And the small charging current implies a large charging time. Indeed, most of the charging time will be during operation approaching point C.

Furthermore, the different chemistries of various battery types preferably use differing recharging programs, and varying battery capacities (sizes) demand differing charging currents. However, known battery chargers cannot adapt to such a variety charging conditions and remain simple to use.

Features

The present invention provides battery charging with a multipart load line by sensing battery charge and responsively adjusting charging voltage and series resistance. This permits adaptation to various battery chemistries and capacities, and, in particular, allows for constant charging with an approximately constant current and for trickle charging with a trickle current. The invention further provides an integrated circuit battery charger with programmable multipart load line in a three pin package. This yields an easy-to-use battery charger which may be designed into a battery pack and programmed for near-optimal recharging. Further, the battery charger may be tested and trimmed after packaging by one-wire communication.

BRIEF DESCRIPTION OF THE DRAWINGS

The present invention will be described with reference to the accompanying drawings, which are schematic for clarity.

FIGS. 2a–b are schematic functional and block diagrams of a first preferred embodiment battery charger;

DESCRIPTION OF THE PREFERRED EMBODIMENTS

Functional Overview

Figure 2A:
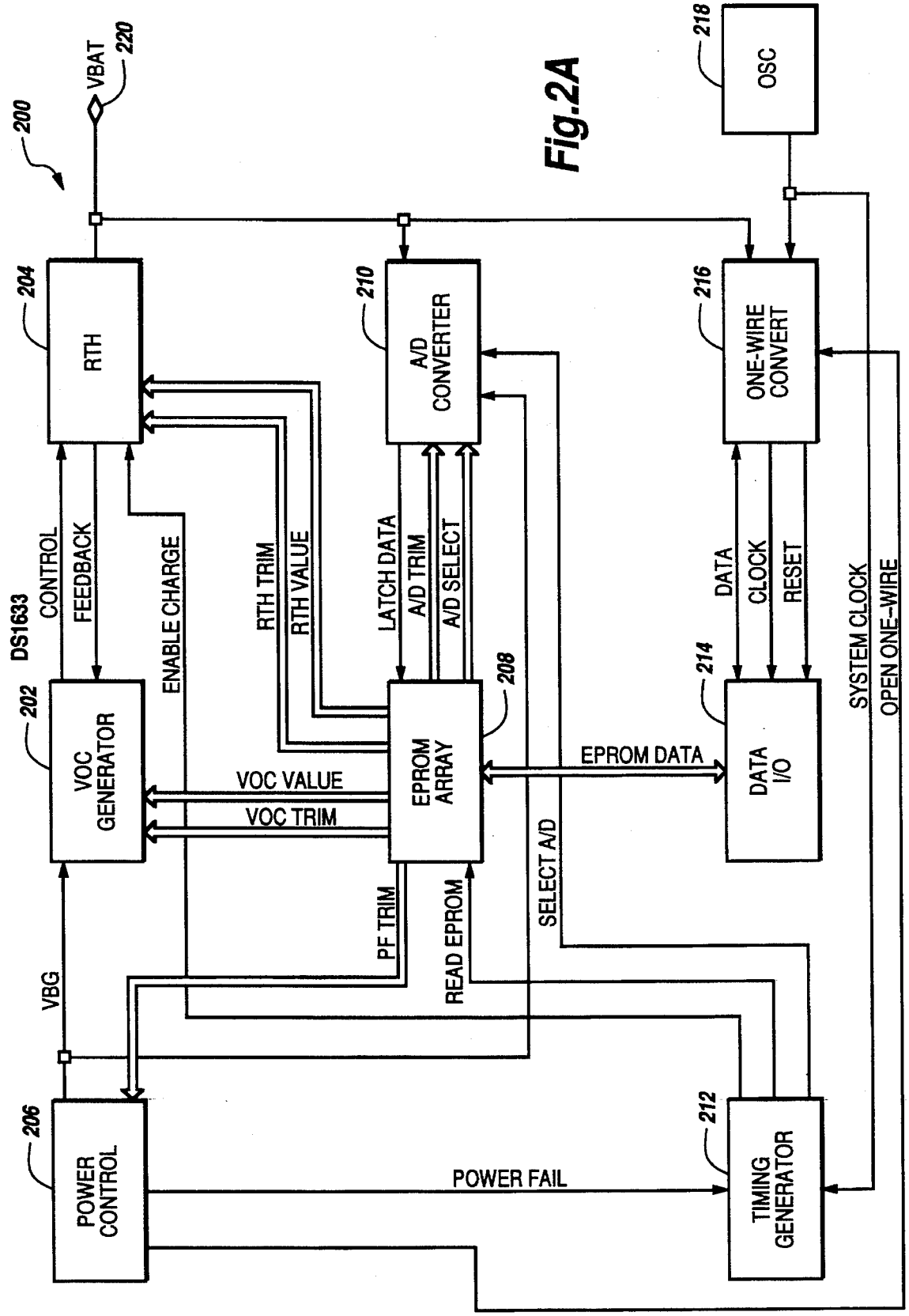

FIG. 2a is a schematic functional block diagram of a first preferred embodiment battery charger, denoted generally by reference numeral 200, which includes open circuit voltage control 202 which generates open circuit voltage $V_{OC}$, variable resistor 204 which provides resistance $R_{TH}$, power control 206, EPROM memory array 208 for storing operating parameters, analog-to-digital (A/D) converter 210 for comparing a charging battery's voltage to digitized breakpoint voltages, timing generator 212, data input/output 214 for reading and writing data from and to memory array 208, input/output format interface 216, oscillator 218, and VBAT terminal 220 for connection to a charging battery. The ground and external power input terminals do not appear in FIG. 2a. FIG. 2b shows block diagram of a component circuit layout of charger 200 and includes test pads for wafer probing. The blocks of FIG. 2b correspond to the blocks of FIG. 2a roughly as indicated by the reference numerals.

Figure 3:
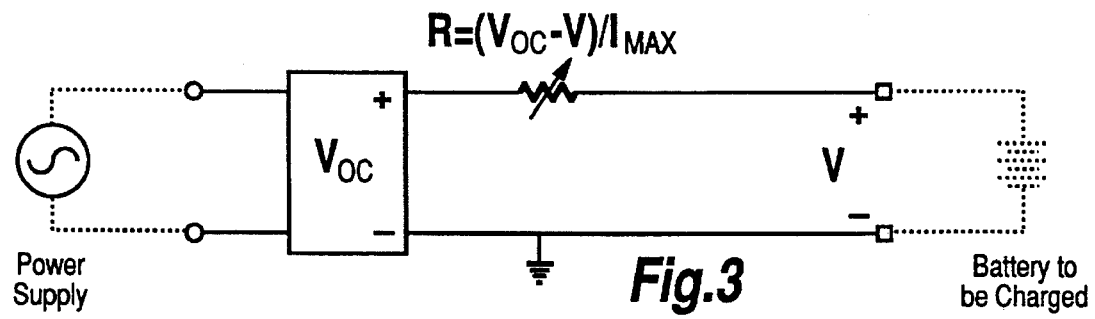
FIG. 3 heuristically illustrates the first preferred embodiment.

Charger 200 can approximate the ideal constant current operation illustrated in FIG. 3: it can roughly apply an open circuit voltage $V_{OC}$ through a variable resistor to a battery to be charged, with the resistance of the variable resistor tracking the battery voltage to preserve a maximal charging current $I_{MAX}$. This continues until the battery voltage reaches $V_{MAX}$.

Figure 1A:
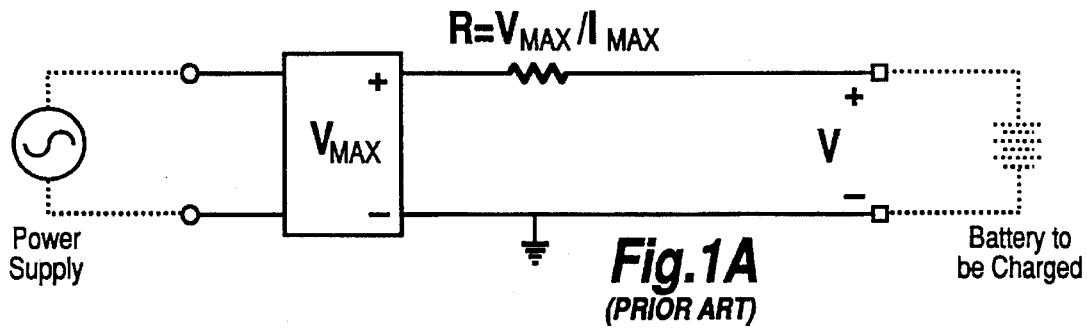
FIGS. 1a–b illustrate known battery chargers and their load lines.
Figure 1B:
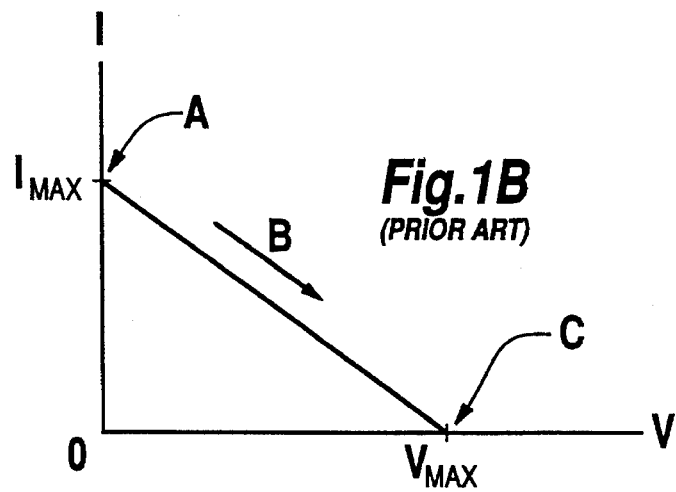
Figure 4A:
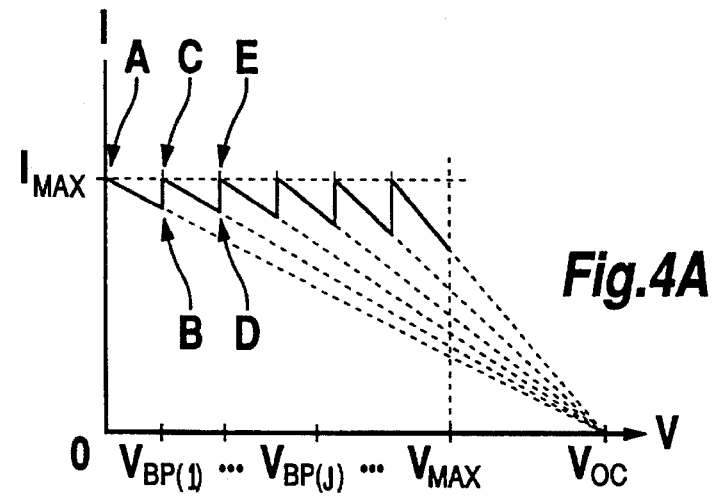
FIGS. 4a–c show load line adjustments and operation flow chart of the first preferred embodiment.

FIG. 4a is analogous to FIG. 1b and illustrates the actual constant current operation of charger 200. In particular, for a fully discharged battery which can accept $I_{MAX}$ charging current and $V_{MAX}$ charging voltage, charger 200 begins at operating point A of FIG. 4a by applying open circuit voltage $V_{OC}$ to the battery in series with a resistor of resistance $V_{OC}/I_{MAX}$. Voltage control 202 applies $V_{OC}$, which exceeds $V_{MAX}$, to variable resistor 204 which provides the series resistance $V_{OC}/I_{MAX}$. As the battery charges up, its voltage increases and the operating point of charger 200 moves down the load line; A/D converter block 210 senses the magnitude of the battery's voltage and compares it to the breakpoint voltage. Eventually, charger 200 reaches operating point B where the battery voltage equals $V_{BP(1)}$, the first break point voltage, and charger 200 then decreases the resistance of variable resistor 204 from a resistance of $V_{OC}/I_{MAX}$ down to a resistance of $(V_{OC}-V_{BP(1)})/I_{MAX}$. This jumps charger 200 to operating point C in FIG. 4a and the charging current returns to $I_{MAX}$. Again, as the battery further charges up, its voltage reaches a second break point, $V_{BP(2)}$, and charger 200 jumps from operating point D to operating point E by again decreasing the resistance of variable resistor 204, from $(V_{OC}-V_{BP(1)})/I_{MAX}$ to $(V_{OC}-V_{BP(2)})/I_{MAX}$. Charger 200 repeats this cycle of jumping to a lower resistance and consequently higher charging current at each break point voltage until the battery has charged up to $V_{MAX}$. During the battery charging the charging current remains close to $I_{MAX}$ and thus leads to minimal overall charging time by an approximately constant current without exceeding $V_{MAX}$ battery voltage.

Figure 4B:
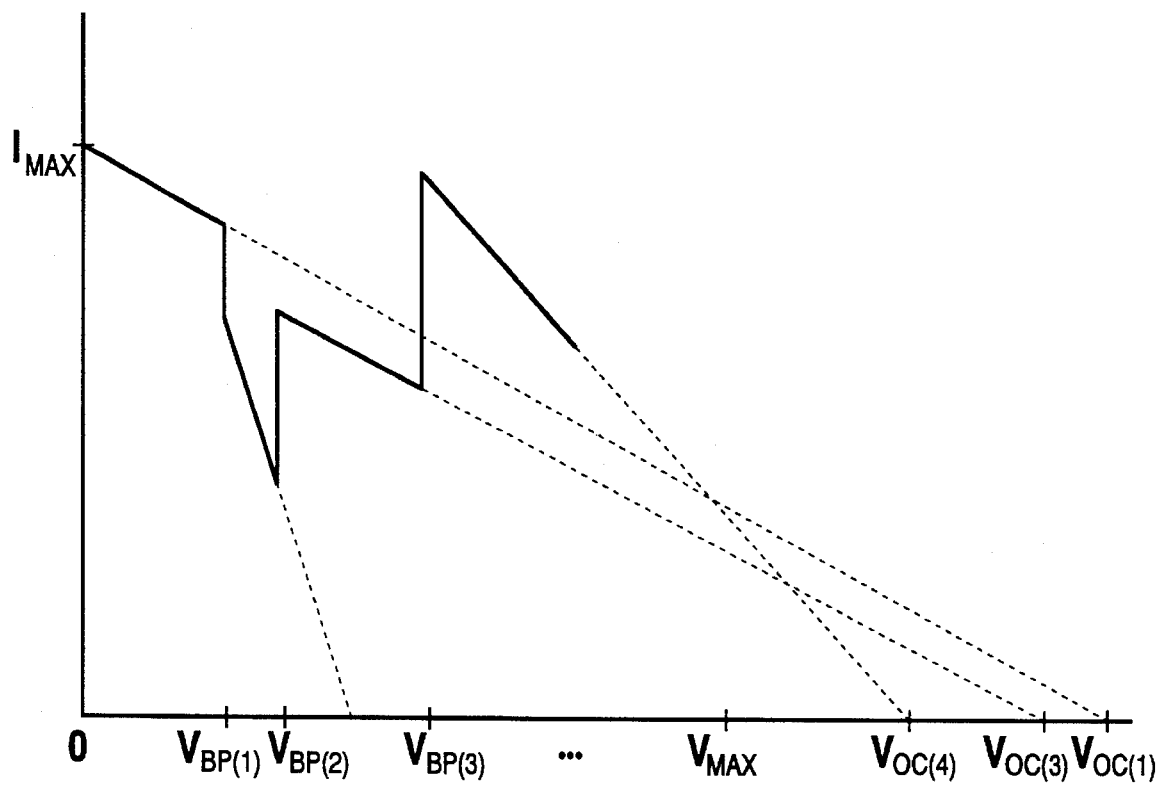

EPROM memory array 208 contains 25-bit registers which hold parameters for the operation of charger 200. In particular, thirty-two of the registers each contains seven bits to set $V_{OC(j)}$, seven bits to set $R_{TH(j)}$, and seven bits to set $V_{BP(j)}$. That is, each register has a load line definition and a breakpoint voltage for its use, and thirty-two of these load lines may be patched together to form a multipart load line. FIG. 4b suggests the variety of possible multipart load lines available with charger 200.

Charger 200 basically progresses through the load line definitions in register order as the voltage on the battery being charged ramps up. The choices for $V_{OC(j)}$ vary from 1.3 volts to 5.5 volts in 127 increments of 33.07 mV; the choices for $V_{BP(j)}$ vary from 0 to 4.699 volts in 127 increments of 37 mV; and the choices for $R_{TH(j)}$ vary from 7.5 ohms to 5060 ohms in 127 goemetrically increasing increments so that the ratio of adjacent resistances is 0.95.

Figure 4C:
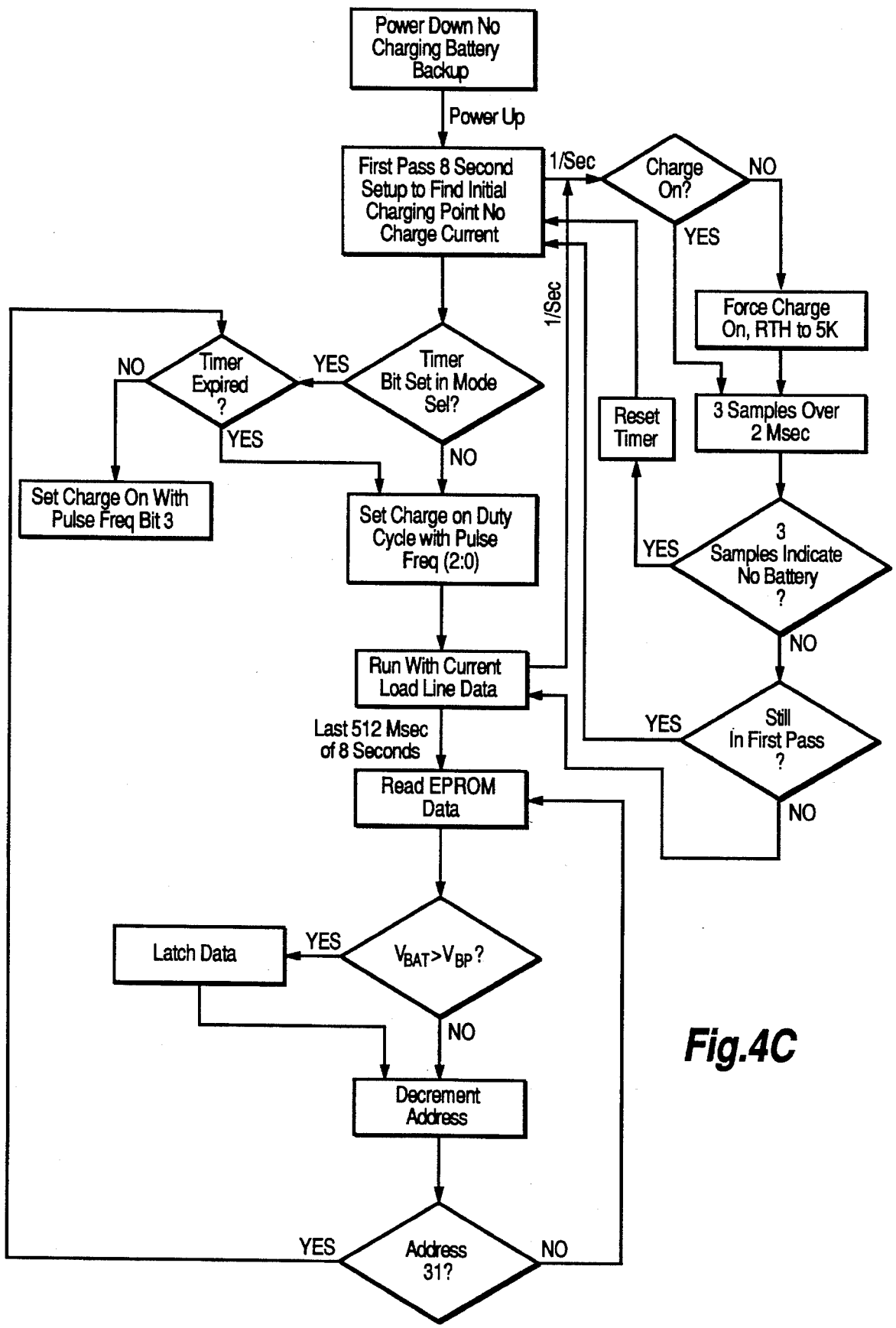

Charger 200 makes the substitution of a new seven bits to set $V_{OC(j+1)}$, seven bits to set $R_{TH(j+1)}$, and seven bits to set $V_{BP(j+1)}$ when the battery voltage reaches $V_{BP(j)}$ through a scanning process in connection with an 8 second time interval as follows. At the end of each 8 second interval, A/D converter 210 activates to compare the battery voltage at VBAT with all thirty-two breakpoint voltages $V_{BP(j)}$ stored in the registers in EPROM memory array 208: the register contents are read in register order (which should also be $V_{BP(j)}$ order) and the first $V_{BP(j)}$ which exceeds VBAT causes the data from its register to be latched in as the operating parameters for the next 8 second interval. The scanning takes about 512 milliseconds. This repeats every 8 seconds and FIG. 4c is a flow chart for the operation.

The thirty-two registers in memory array 208 each also contain a 4-bit duty cycle code. Bit 4 is read only when the timer is running; it is an on/off bit to offer full charge or to halt charging if the measured battery voltage goes out of bounds. The timer, when running, limits charging time to the time programmed. Bits 1–3 determine the duty cycle when the timer is off. The duty cycle code determines the duty cycle of charger 200 in terms of the 8 second intervals; that is, charger 200 will be on for 8, 4, 2, ..., ¼, ⅛, or 0 seconds, as programmed, during each 8 second interval while using a particular $V_{OC(j)}$ and $R_{TH(j)}$ with the battery voltage (initially) below the particular $V_{BP(j)}$. This provides for trickle charging of NiCad and NiMH batteries to counter the self-discharge of such batteries once full charge have been reached. The duty cycle bits also can be used for pulsed charge in some batteries with a higher than normal current is applied for a short duration to speed up charging for some battery chemistries.

Memory array 208 contains two further 25-bit registers. One 25-bit register holds trim data for trimming the values of $R_{TH(j)}$, $V_{OC(j)}$, $V_{BP(j)}$ (A/D converter 210), power fall detection 206, and oscillator 218. Measuring the output voltage and current during testing leads to trim values needed and which may be programmed after packaging and at the factory. The other 25-bit register holds data for timed charging and for adaption to 6 volt dc input power supply instead of standard 5 volt. The timer may be programmed for charging times of 2 hours through 32 hours in 2 hour increments. In the 5 volt power supply mode, charger 200 applies to batteries with $V_{MAX}$ up to 3.737 volts, and in the 6 volt power supply mode, to batteries with $V_{MAX}$ up to 4.699 volts. The open circuit voltage $V_{OC}$ for the 5 volt power supply mode can be between 1.3 and 4.496 volts and for the 6 volt power supply mode between 1.3 and 5.5 volts. As shown in FIG. 4c, upon power up charger 200 goes through a first pass 8 second cycle in which the trim codes, charge time, and initial charging parameter codes are read, and the charging begins with the next 8 second cycle.

Application of a high voltage (8 volts) pulse to output terminal 220 opens input/output interface 216 to receive serial commands for either reading the registers or programming the registers and for entering testing commands.

Charging Circuit

Figure 5:
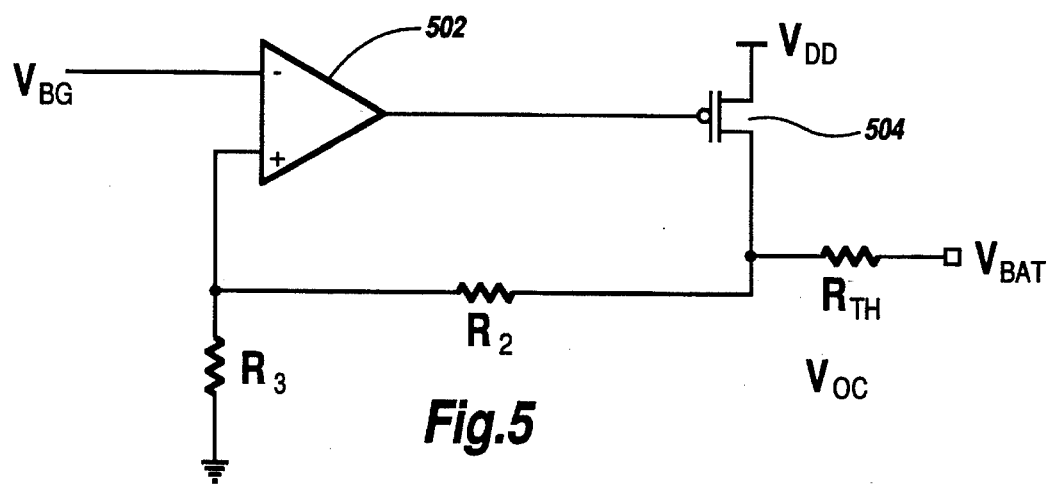
FIG. 5 shows the charge circuit of the first preferred embodiment.

FIG. 5 heuristically shows the charging circuitry of battery charger 200 with a selected series resistance, $R_{TH}$, and open circuit voltage, $V_{OC}$. Operational amplifier 502 drives the gate of PMOS 504 which actually supplies the charging current through resistance RTH to a battery connected at terminal VBAT. The feedback of $V_{OC}$ to op-amp 502 controls the channel resistance of PMOS 504 to maintain $V_{OC}$ at the voltage determined by the resistances and the bandgap reference voltage. The temperature stabilized bandgap reference voltage VBG is 1.22 volts, so the milo of the resistances $R_2$ and $R_3$ determine $V_{OC}$ by $$V_{OC}=1.22(R_2+R_3)/R_3$$

The resistance $R_2$ is selectable to thereby select the level of $V_{OC}$. Opamp 502 and resistances $R_2$ and $R_3$ are located in voltage control block 202 of FIG. 2, and PMOS 504 and resistance $R_{TH}$ form one of the members of variable resistor block 204.

Open Circuit Voltage Control

Figure 6:
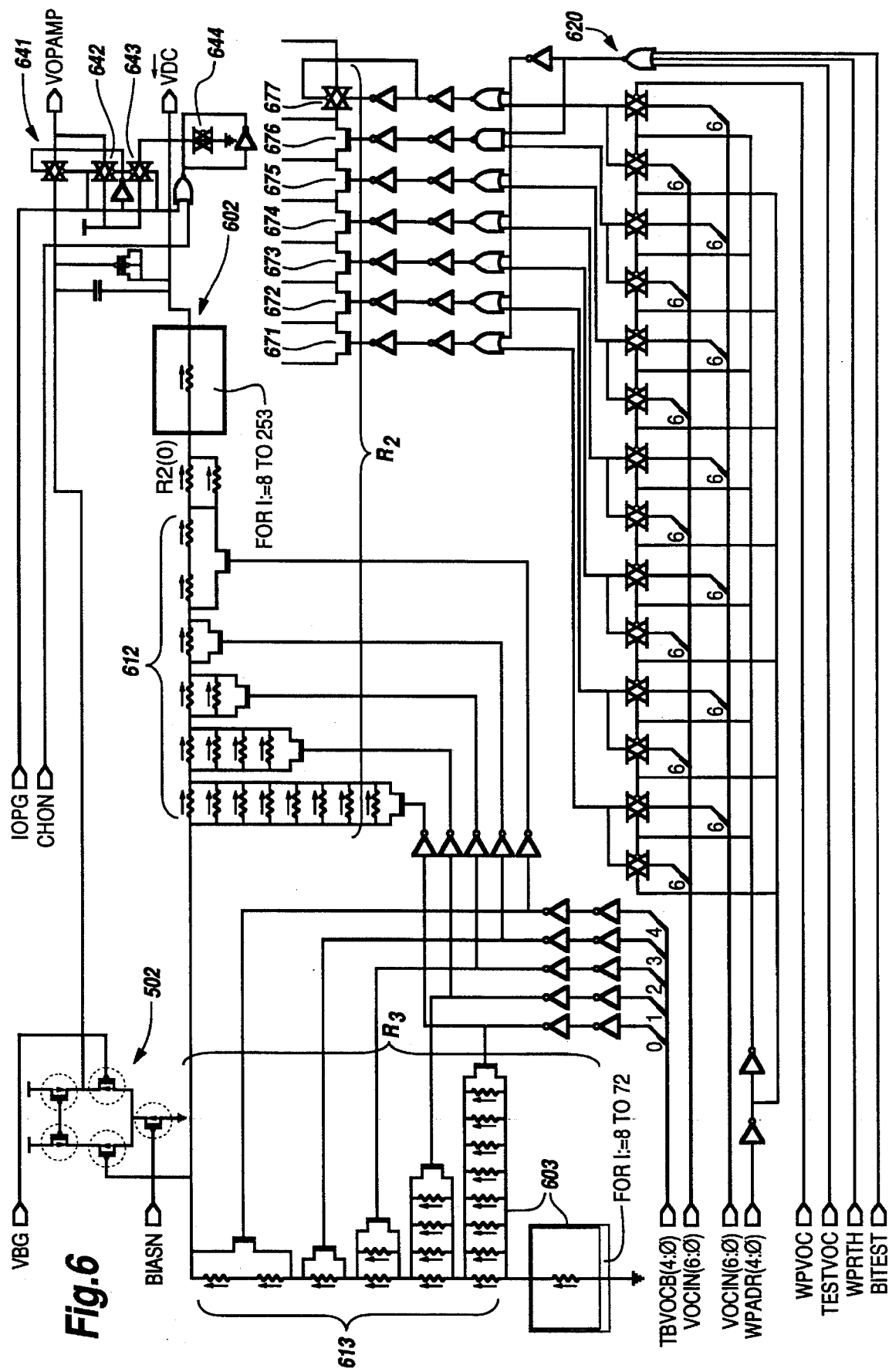
FIGS. 6–14 are schematic circuit diagrams of blocks shown in FIG. 2b and with FIG. 9 a programming flow chart.

FIG. 6 is a schematic circuit diagram of voltage control block 202 and shows resistance $R_3$ as the series combination of fixed resistor 603 of 62.1 Kohms and binary weighted trim resistor array 613 controlled by the five bits on bus TBVOCB(4:0). Trim array 613 has a resistance selectable between 0 and 3.24 Kohms with increments of about 105 ohms. Resistance $R_2$ is made of variable resistor array 602 and trim resistor array 612. Trim array 612 is the same as trim army 613 except driven with the complements of the same five control bits; this implies a trimming by adjustment of the five bits on bus TBVOCB(4:0) changes the ratio of resistance $R_2$ to resistance $R_3$ but does not change the resistance of the sum $R_2+R_3$. That is, block 202 has a linear trim. After trim the node R2(0) will always be set to 1.3 V. The resistors were made to a unit size to help matching, but the resistor to ground is of an odd size since 5.5 V to 1.3 V with unit resistors does not leave a unit size to ground.

The seven bits on bus VOCIN(6:0) or on bus WPADR(6:0) control resistor array 602 with the bit on line WPVOC determining which bus controls: a low on WPVOC drives transmission gates 620 to provide VOCIN control, and a high on WPVOC switches the transmission gates to provide WPADR(6:0) control. WPADR(6:0) is used for testing and VOCIN(6:0) controls during normal operation. Resistor array 602 has seven resistors in series with binary weighted resistances (each resistor has double the resistance of the preceding one) and a total resistance of 212.5 Kohms. Thus the smallest resistance is about 1.67 Kohms, and adjustments to the resistance are made by shorting out various ones of the seven resistors. In particular, NMOS 671 will short out the smallest resistance, NMOS 672 will short out double the smallest resistance, and so forth. Transmission gate 677 is used instead of an NMOS to short out the largest resistance (about 107.1 Kohms).

A 0 bit on bus VOCIN(6:0) or WPADR(6:0) will turn on the corresponding NMOS or transmission gate 671–677 and remove the corresponding resistor from resistor array 612. Thus a 0000000 on bus VOCIN(6:0) or WPADR(6:0) would drop the resistor array 602 to its minimum of 0 ohms and a 1111111 would put array 602 at its maximum of 212.5 Kohms. The minimum corresponds to a small $R_2$ and thus a $V_{OC}$ close to a minimal 1.3 volts and a maximum corresponds to a large $R_2$ and thus a $V_{OC}$ close to a maximal 5.5 volts.

FIG. 6 also shows opamp 502 as an NMOS differential pair with a PMOS current mirror load. The bandgap reference voltage VBG (1.22 volts) drives one NMOS of the pair and the node between resistances $R_2$ and $R_3$ drives the other NMOS of the pair. The output swings from Vdd to 0.3 volt. Transmission gates 641–644 couple the input and output of opamp 502 to nodes VOC and VOPAMP as follows. During normal operation IOPG is low and CHON is high, and gate 641 connects the output of opamp 502 to node VOPAMP and connects node $V_{OC}$ to resistance $R_2$ which connects to an input of opamp 502. This is the setup of FIG. 5.

However, when CHON goes low, gate 644 becomes conducting and pulls node VOC (and the input of opamp 502) down to ground. Conversely, when IOPG is high, the output of opamp 502 is ignored and gate 642 connects node VOPAMP to Vdd and gate 643 pulls node VOC up to Vdd which also pulls the input of opamp 502 up to Vdd $R_2/(R_2+R_3)$. Programming the battery charger parameters in EPROM array 208 uses IOPG high to protect the gate oxides. And CHON set low forces VOPAMP high which keeps the circuit in a known state and also lowers the static circuit current draw. If TESTVOC, WPRTH or BITEST are high, $V_{OC}$ is forced to 4.442 V (5 F) for testing purposes. If WPVOC is high, the WPADR(6:0) signals force VOC to the value specified by the bus to allow wafer probe testing of all of the VOC values. Normally, VOCIN(6:0) controls the value of VOC.

Variable Resistor

Figure 7A:
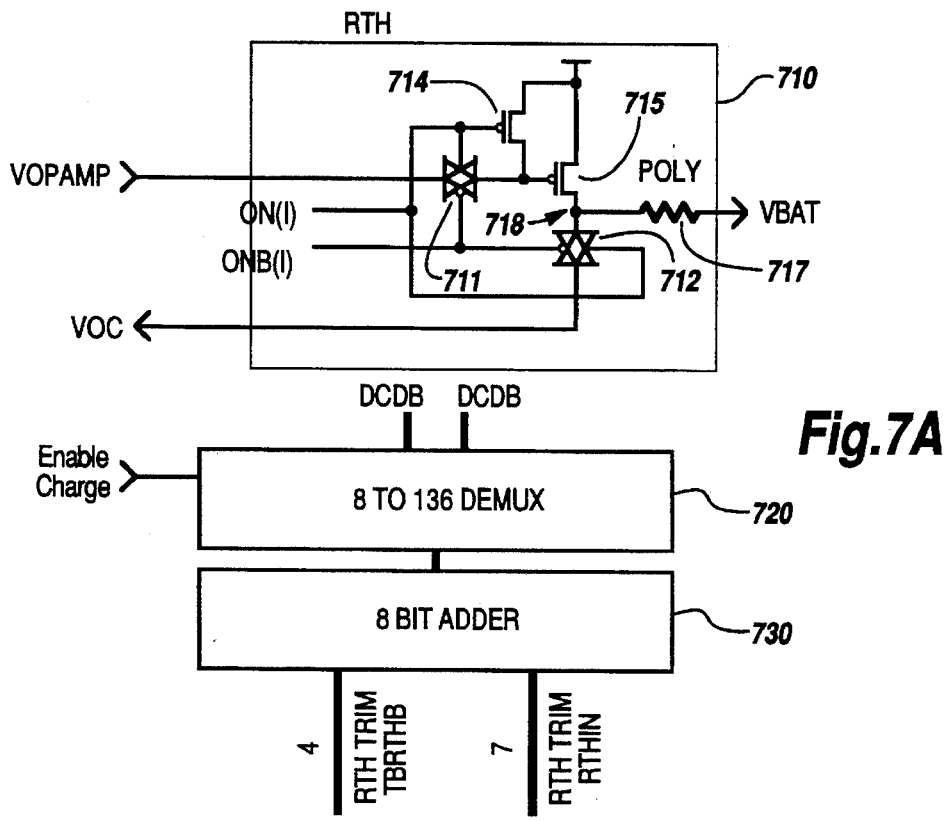

FIG. 7a schematically shows variable resistor block 204 which includes 136 resistor cells with each cell of the structure of illustrated cell 710. Demultiplexer 720 provides activation signals to the 136 cells to set the variable resistance (resistor R in FIG. 3 and $R_{TH}$ in FIG. 5) from the 8-bit output of adder 730. Adder 730 adds the 7-bit resistor code on line RTHIN to a 4-bit resistor trim code on line TBRTHB, this trim code compensates for variation in the resistivity of the polysilicon used to fabricate the resistor of each cell 710.

Cell 710 operates as follows. When ON(j) is low and ONB(j) is high for the jth cell, pullup PMOS 714 is turned on and the transmission gates 711–712 are both nonconducting. Thus both VOPAMP and VOC are isolated from remainder of the cell. PMOS 714 on pulls up the gate of and turns off control PMOS 715 and thereby floats the end 718 of polysilicon resistor 717 (the other end of resistor 717 connects to terminal VBAT along with the resistors of the other 135 cells).

Conversely, when ON(j) is high and ONB(j) is low, pull up PMOS 714 is turned off and transmission gates 711–712 are both conducting. This connects the gate of control PMOS 715 to VOPAMP and the end 718 of resistor 717 to VOC. Thus the jth cell has the connections as shown in FIG. 5 with control PMOS 715 identified with PMOS 504 and resistor 717 identified with resistor $R_{TH}$. If two or more cells are activated simultaneously, then the ends 718 of resistors 717 of the activated cells will all be tied together to VOC, VOPAMP will simultaneoulsy control all of the parallel PMOS 715s of the activated cells, and all of the resistors 717 of the activated cells will be in parallel between $V_{OC}$ and VBAT. Amongst the cells 710, the channel width of PMOS 715 is proportional to the inverse of the resistance of resistor 717. Thus the turned-on channel resistance of PMOS 715 for an applied gate voltage is proportional to the resistor 717 resistance which implies proportional currents and permits paralleling. Paralleling the resistors permits use of reasonable size resistors to achieve the desired resistance.

Figure 7B:
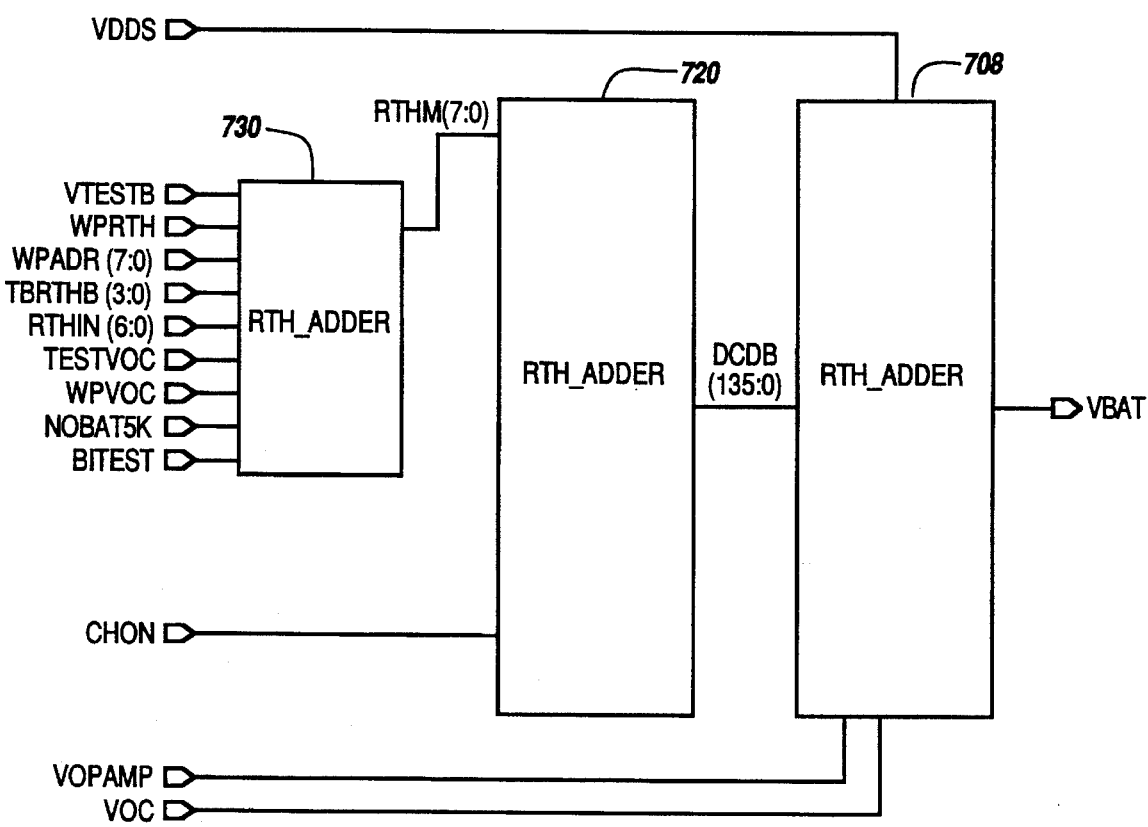
Figure 7C:
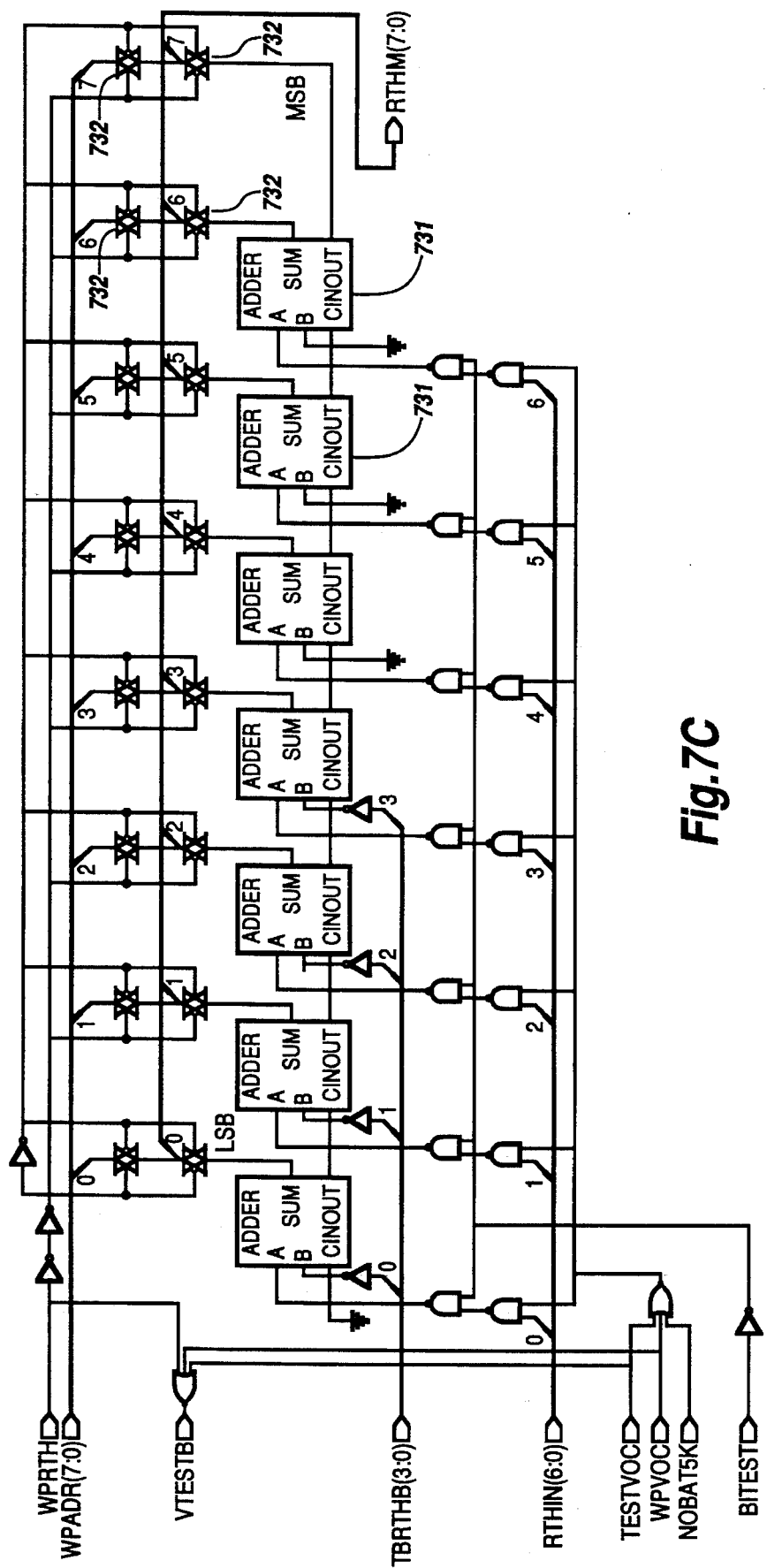

FIG. 7b shows block 204 in subblock form and including test probe signals. The subblock 708 includes all of the 136 cells 710. FIG. 7c shows adder 730 as containing seven full adders 731 which add bitwise the four trim bits on bus TBRTHB(3:0) to the seven resistance selection bits on bus RTHIN(6:0) and outputting this on 8-bit bus RTHM(7:0) when the test probe signal WPRTH is low. Adder 730 performs the multiplexing to get RTHM(7:0) out of the various inputs. When WPRTH goes high during wafer probe testing, WPADR(7:0) is put onto RTHM(7:0). Otherwise RTHM(7:0) is the output of a 7 bit adder with RTHM-7 the carry out of the last adder bit since the input bus is 7 bits maximum. The RTH values are trimmed by adding a fixed trim value stored in EPROM to slide the minimum and maximum RTH along the 136 possible values. RTHIN(6:0) is the latched EPROM data and is the normal input to control RTH during operation. This value can be overridden by several factors. BITEST causes the minimum RTH to be selected by forcing the input to the adder to all ones. The test modes and NOBATSK cause an input of all zeros to the adder to force the maximum RTH. VTESTB is created here since it was a convenient place to put it with its inputs in close proximity to each other.

Figure 7D:
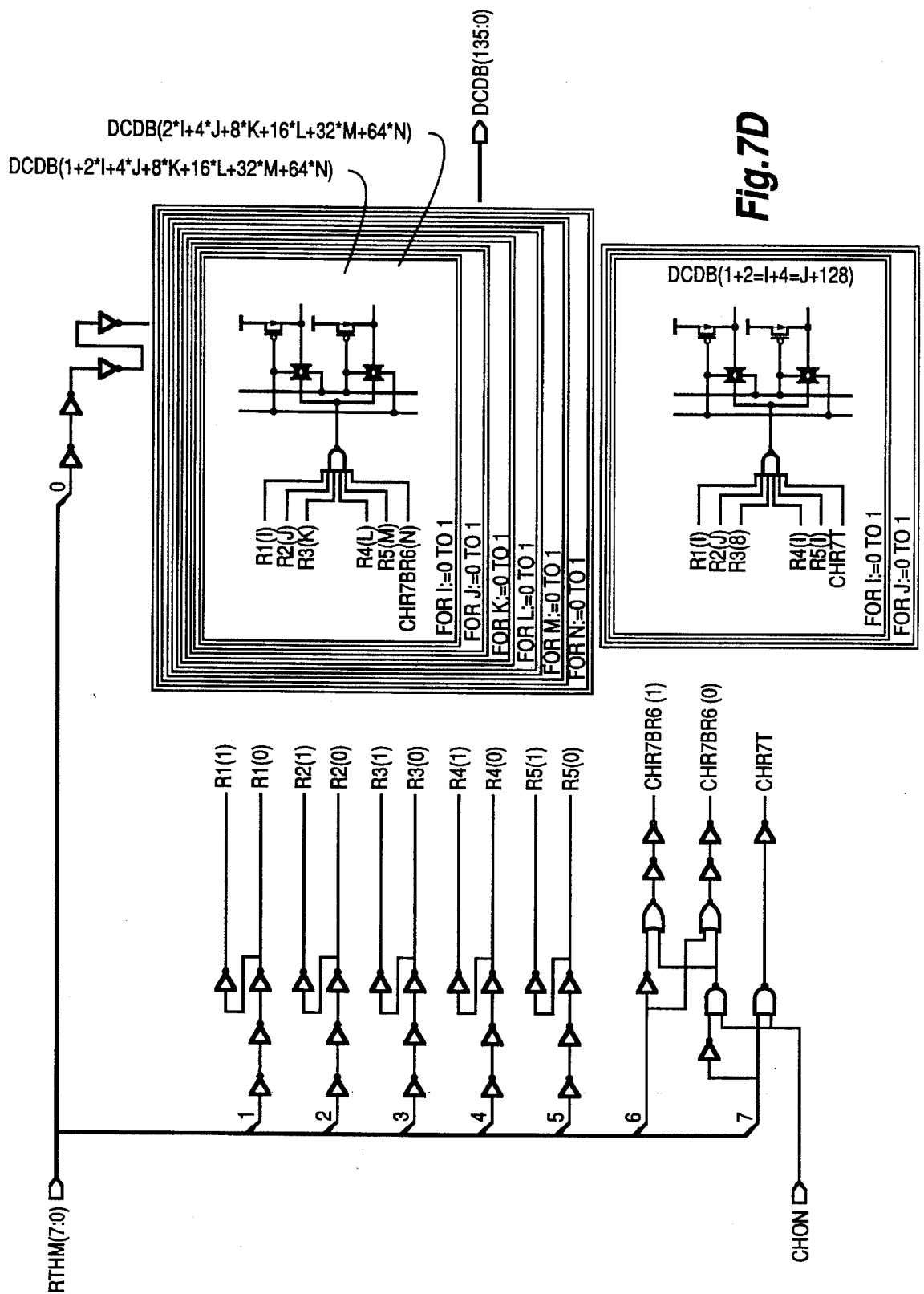

FIG. 7d show the decoding of the eight bits on bus RTHM(7:0) to yield the 136 signals DCDB(135:0) with precisely one DCDB(j)=0 and the remainder high. Decoder 720 decodes RTHM(7:0) into DCDB(135:0) with CHON as an enable. The last stage is a tree decode preceded by a 6 input NAND gate decoder. This was done to fit the pitch set by the RTH_ARRAY p-channels and control logic. The 6 input NAND gate means only CHON and the 6 and 7 lines from RTHM need to be predecoded. This is a simple matter since only the bottom 136 of the possible 256 decodes are used allowing some of these predecode terms to be combined and some ignored. One note about the names: the name RO(1) is equivalent to ROT (true) and RO(O) is equivalent to ROB (false). CHR7BR6(1) is active (a one output) with CHON=L, R7=0, R6=1 while CHR7BR6(0) is active with CHON=L, R7=0, and R6=0. The node names inside of the frames are binary values corresponding to the node expression.

Figure 7E:
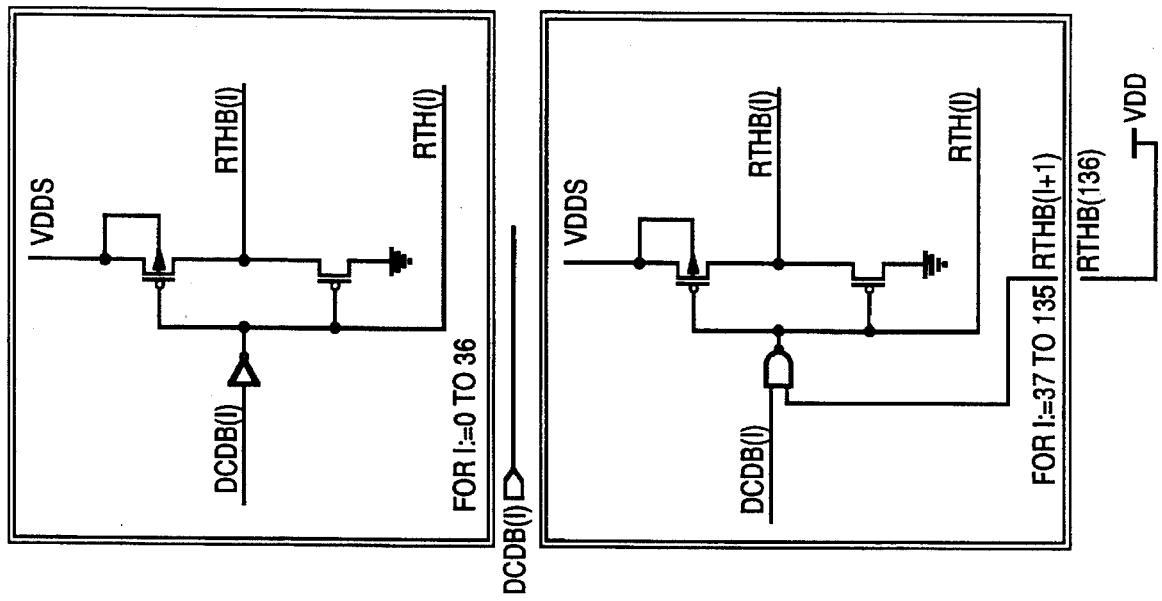
Figure 7E:
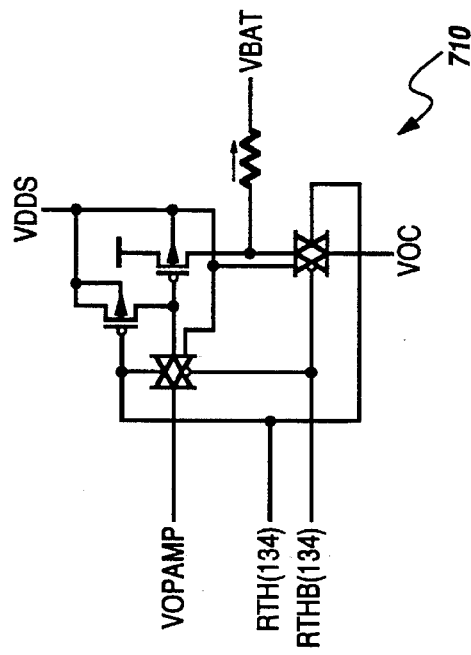

FIG. 7e shows the jth resistor cell 710 plus the decoding of DCDB(135:0) to RTH(j) and RTHB(j) for j=0 to 135. Resistor cells 0 through 36 are only on one at a time while resistor cells 37 through 135 are paralleled to create the needed resistance and keep the individual resistor size at a reasonable value. The 0th resistor cell has a resistance of about 6.24 Kohms and the resistance decreases with increasing j for the jth cell up to the 37th cell which has a resistance of about 930 ohms; these are the singly activated cells by DCDB(j)=0 for the appropriate j in the range of 0 to 37. The 38th cell has a resistance of about 17.67 Kohms and the resistance again decreases with increasing j for the jth cell up to the 135th cell which has a resistance of about 120 ohms; however, when these cells are active, so is the 37th cell in parallel. Signals RTH(j) high and RTHB(j) low activate the jth resistor cell 710 and add its resistor in parallel to any other activated cell's resistors. The automatic paralleling within cells 37 through 135 is accomplished with look ahead logic. If the I+1 resistor is on, then the I resistor must also be on, and thus all others down to I=38. Hence, DCDB(37)=0 activates the 37th cell (with resistor about 930 ohms); DCDB(38)=0 activates both the 37th and the 38th cells which adds about 17.67 Kohms in parallel with the about 930 ohms of the 37th cell to have a net resistance of about 883 ohms; DCDB(39)=0 activates the 37th, 38th, and 39th cells which adds about 17.67 Kohms and 16.8 Kohms in parallel with the about 930 ohms of the 37th cell to have a net resistance of about 839 ohms, and so forth up to DCDB(135)=0 activates all cells from 37 through 135.

Note that an input of 0000 0000 on RTHM(7:0) with CHON high will generate DCDB(0)=0 and DCDB(j)=1 for all j=1, 2, ..., 135, and this yields the maximum resistance of about 6.25 Kohms for the variable resistor; whereas, the input of 1000 0111 will have DCDB(135)=0 and the minimum resistance of about 6.1 ohms.

In order to maintain substrate bias with VDD removed and a battery still attached or during programming, the inverter to RTHB must be powered by VDDS since its off state is at a 1. The n-channel is thick oxide because during programming it will be off and have a 12 V Vds. The p-channel is a normal device since its Vds will be effectively 0 during programming and it needs a low Vt for battery back-up down to a minimum of 1 V. (The thick oxide p-channel has a 2.2 Volt threshold.) The resistor cells are all identical except for the resistor and p-channel sizes. The transmission gates are to isolate each unused section with the 10/1.2 p-channel to pull the unused output driver gates high. The wells are all powered by VDDS to keep from forward biasing the wells when battery is higher than VDD. The devices in each cell are able to be normal thin oxide devices since the Vds is never allowed to go beyond 5 V during programming.

EPROM Memory Array

Figure 8A:
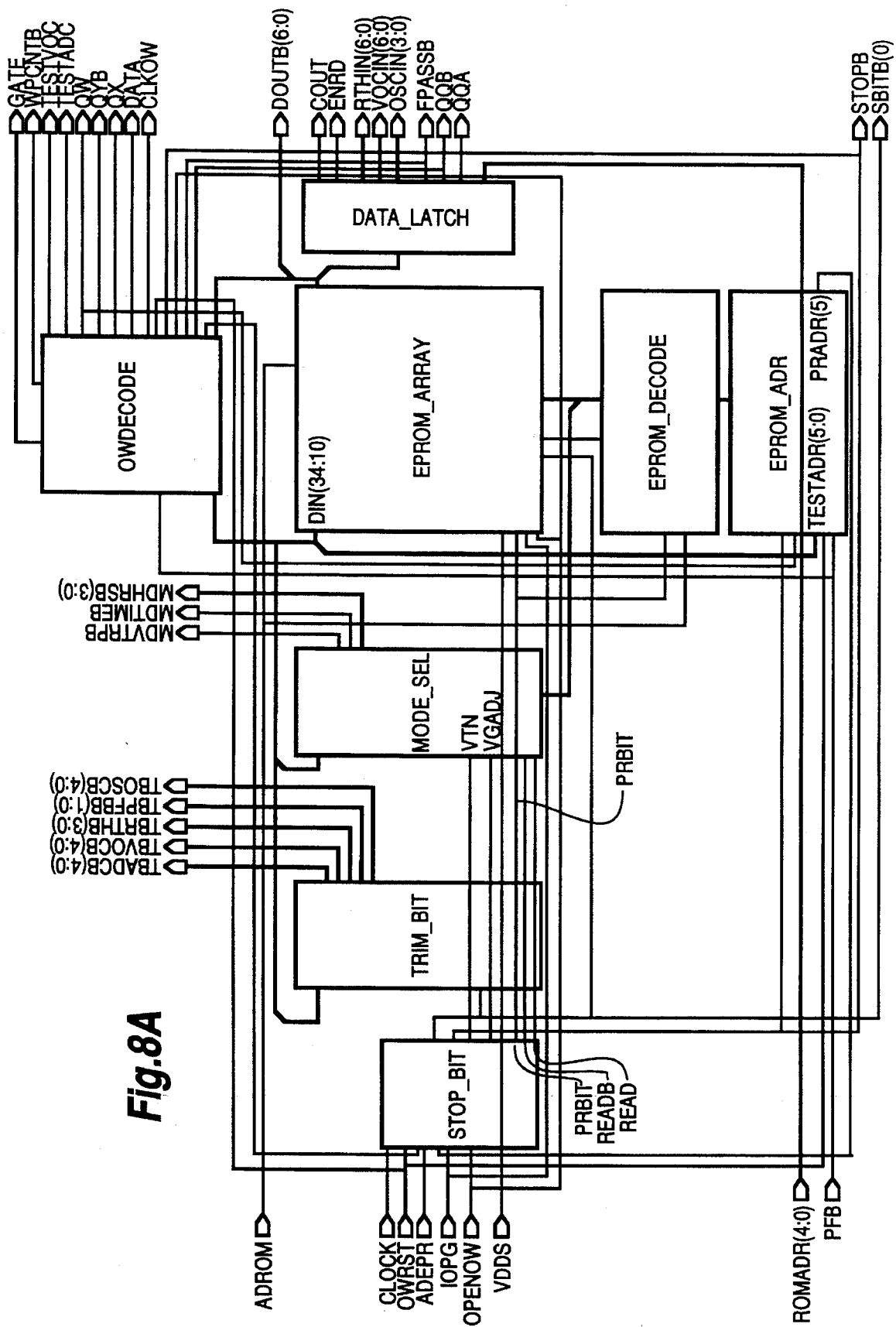

FIG. 8a shows EPROM Memory Array block 208 as subblocks STOP_BIT, ERPOM_ARRAY, TRIM_BIT, MODE_SEL, OWDECODE, EPROM_DECODE, EPROM_ADR, and DATA_LATCH. Block 208 holds the data registers and their control circuitry: EPROM_ARRAY contains 34 25-bit registers with 32 of the registers programmed to define the load line, TRIM_BIT contains 21 bits of resistor trim data, MODE_SEL has six bits of mode data for 5 V or 6 V operation plus timer options, and STOP_BIT contains four bits for STOPB and SBITB(0) programming signal storage. Each of the first 32 of the 34 25-bit registers holds seven bits of encoded variable resistor $R_{TH(j)}$ setting, seven bits of encoded open circuit voltage level $V_{OC(j)}$, seven bits of encoded breakpoint voltage $V_{BP(j)}$, and four bits of duty cycle. The three wire output of the one-wire decode section creates the data busses for programming and testing the registers (see Testing and Programming section below) while the signals from the Timing Generator (MASTER_CLK), A/D converter (ADC), and PWRCONTROL control the reading of the registers to set up the correct charging operation of charger 200. The following list of signals within block 208 and appearing in FIGS. 8b–h summarizes the operation and will be discussed in greater detail in connection with the relevant Figure.

PRBIT: Program Bit. When this goes to a one, the EPROM bits are enabled to be programmed. It is the AND of WRITE, IOPG, READB, and STOPB.

READ, READB: Read EPROM and Read EPROM Bar. The set-up EPROM bits are read only on power-up and OWRST by this signal which is a guaranteed 2 us pulse.

VTN: N-channel Vt: This is a static Vtn drop from VDD which is applied on another n-channel gate inserted in the EPROM gate path to cause a two Vtn drop to control the read voltage on the EPROM bits.

VGADJ: Gate Voltage Adjust. When this signal is low the two Vtn drop to the EPROM gate is bypassed for programming and normal start-up reads at 4 V. Only when OPENOW is high and IOPG is low does VGADJ go high and insert the two Vtn drop into the gate path.

PRADR(5): Program Address 5. The programming address is held in a counter and when the 33rd address (mode select register) is next to be programmed, this signal goes high to program the bits to mark the end of programming.

DIN(34:10): Data In Bus. The one-wire data is serially shifted into a register which holds the data in information for programming the EPROM array.

TESTADR(5:0): Test Address Bus. This is a subset of DIN(34:10) and is used during post programming testing. This data is a specific address to a register whose data is to be read back out of the part.

Figure 8B:
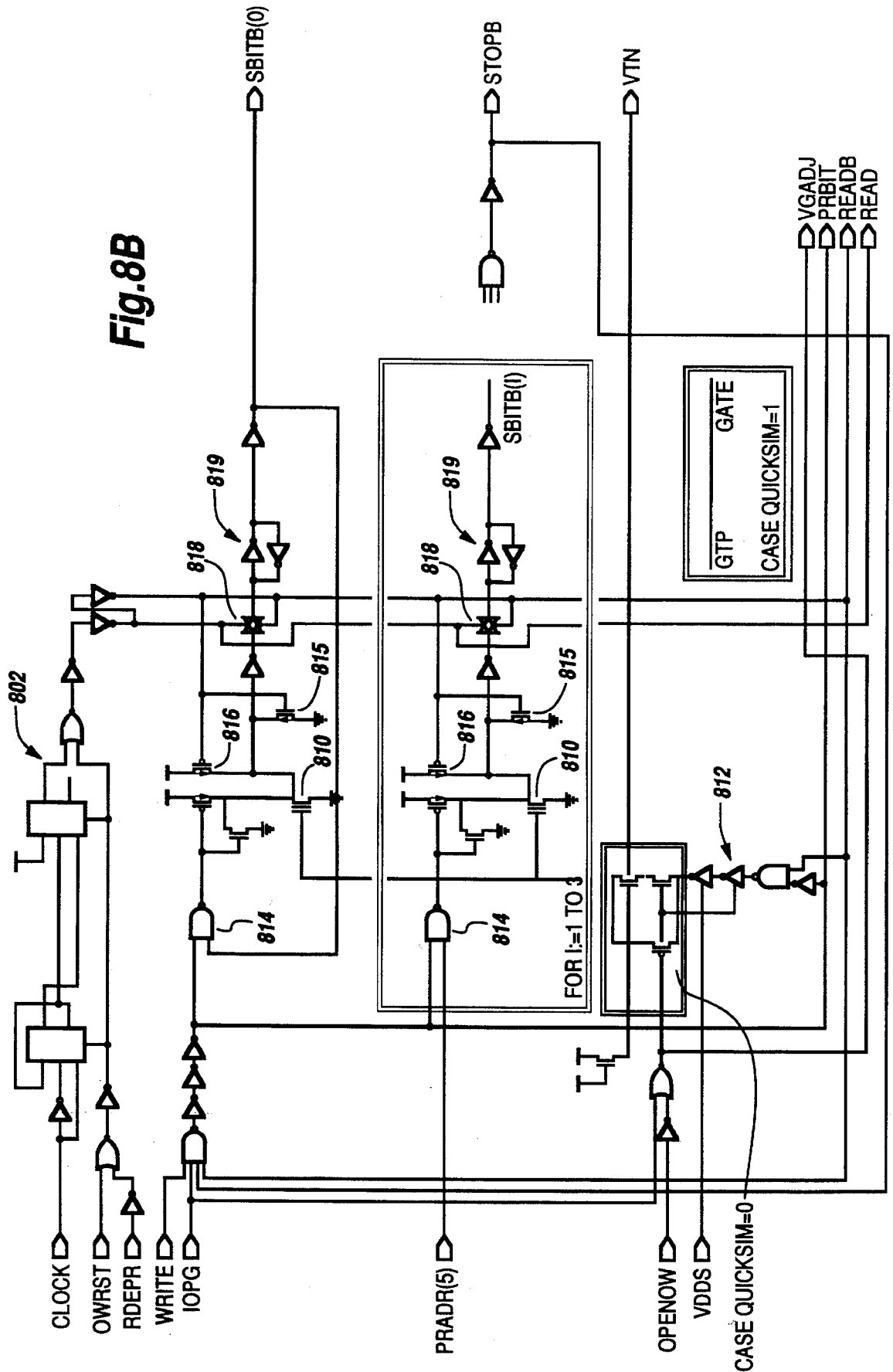
Figure 8C:
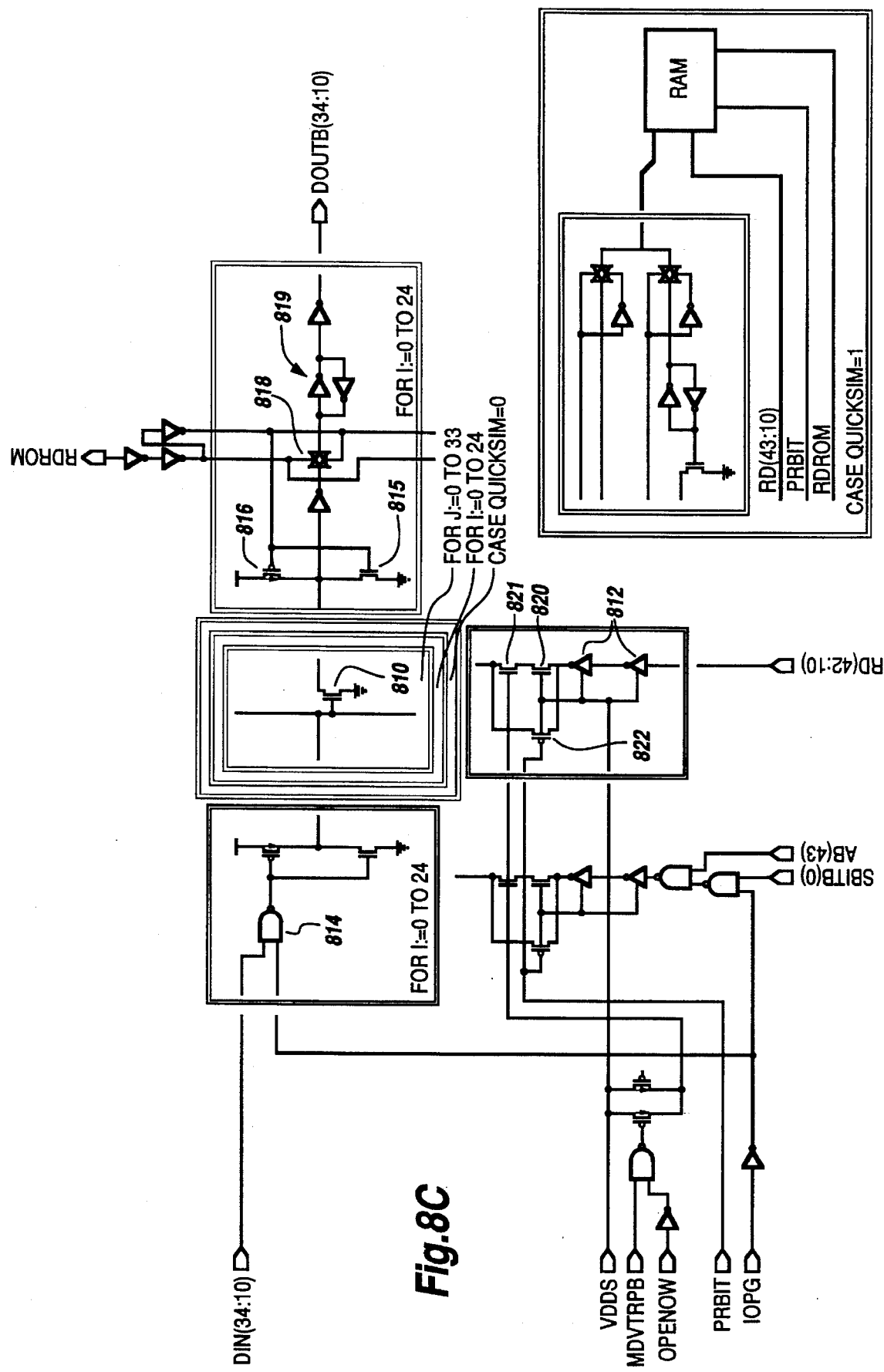
Figure 9:
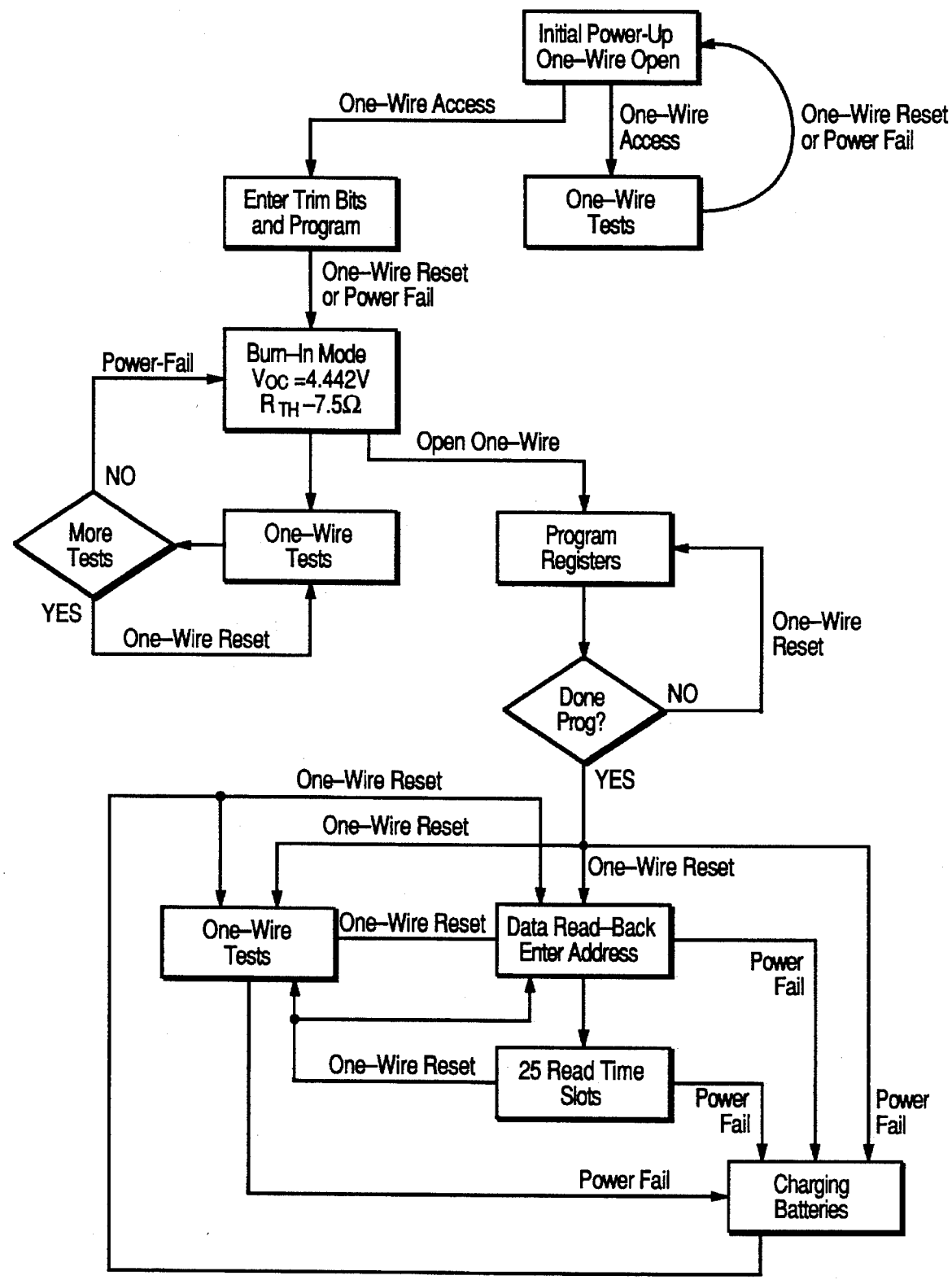

FIG. 8b shows subblock STOP_BIT which controls the access to all EPROM bits programming. The signals SBITB(0) and STOPB form a programming window to control which bits are to be programmed. Upon initial power-up, SBITB(0) and STOPB will be high to allow the trim bits to be programmed. FIG. 9 is a flow chart for the programming operation and shows the trim bit programming in the upper lefthand portion. The Testing and Programming section below contains a description. Trim bits are stored in register 33 which has its cells' gates driven by ADB(43); see FIG. 8c showing EPROM_ARRAY. Once this is done, SBITB(0) goes low so the main breakpoint registers in EPROM_ARRAY can be programmed. The last register programmed also programs SBITB(3:1) to force STOPB to a 0 to close all programming access to the EPROM cells. The EPROM cell and its periphery are nearly identical for all the subblocks. The cell 810 is a read/write cell consisting of a write only sharp graded junction device and a read only regular n-channel device. When a read or a write is not taking place, both drains and the gate of the cell are held at ground to eliminate write stress. During a write the gate goes to 12 V through the thick oxide inverters 812 powered by VDDS. This is a simple level convert from VDD to VDDS power and does burn a maximum of 50 uA from VDDS, but this is inconsequential. Once PRBIT goes high, the data from the other input to NAND gate 814 determines the value to be programmed; a one on the input causes the p-channel to turn on and start the hot electron programming process to force electrons onto the floating gate raising the Vt for a programmed one. A read cycle turns off pull-down 815 on the regular device drain and turns on pull-up 816 while forcing the gate high via AD(j). If the device is programmed high, it will not turn on and the drain will be pulled high by pull-up 816. Otherwise, the device will be on and burn the static current set by pull-up 816, but the drain will stay at a logic zero since the device is much stronger than pull-up 816. This dam is sent through transmission gate 818 opened up when READ goes high and is latched in by a cross coupled inverter pair 819 to retain the data once READ goes back low. The READ pulse is created by a one stage counter 802. RDEPR or OWRST keep counter 802 reset and READ low. Once both these signals are low, READ goes high until CLOCK cycles through the counter, forces QR high, and forces READ back low. RDEPR or OWRST going high starts the cycle over again.

FIG. 8c shows subblock EPROM_ARRAY with the registers having the same reference numerals as in FIG. 8b for corresponding items. The registers contain all of the data programmed into battery charger 200. This is mainly the register data for breakpoints but it also includes redundant trim bit and mode select data in registers 32 and 33. This was necessary since reading the bits back out of the registers read only on start-up and multiplexing this back into DOUTB(34:10) for shifting out of the one-wire port for test would have been virtually impossible. These registers were put at 32 and 33 to be above those normally read for breakpoint information. The gate voltage limiting controls are a little different from STOP_BIT since these bits are read during normal operation and not just once at 4 V on power-up. With a 5 V operating voltage, one Vtn (n-channel 820) is inserted in the gate path while with a 6 V operating voltage, two Vtn (n-channels 820–821) are inserted to keep the gate voltage at approximately 4 V. IOPG going high turns on p-channel 822 and bypasses the Vtn drops to allow the full 12 V to reach the gates for programming. The address controls for the trim bit data are different from the other controls since these bits are programmed first but are actually in the 34th register. RDROM high drives the reading of the cells and latching by latches 819 as output on 25-bit bus DOUT(34:10).

Figure 8D:
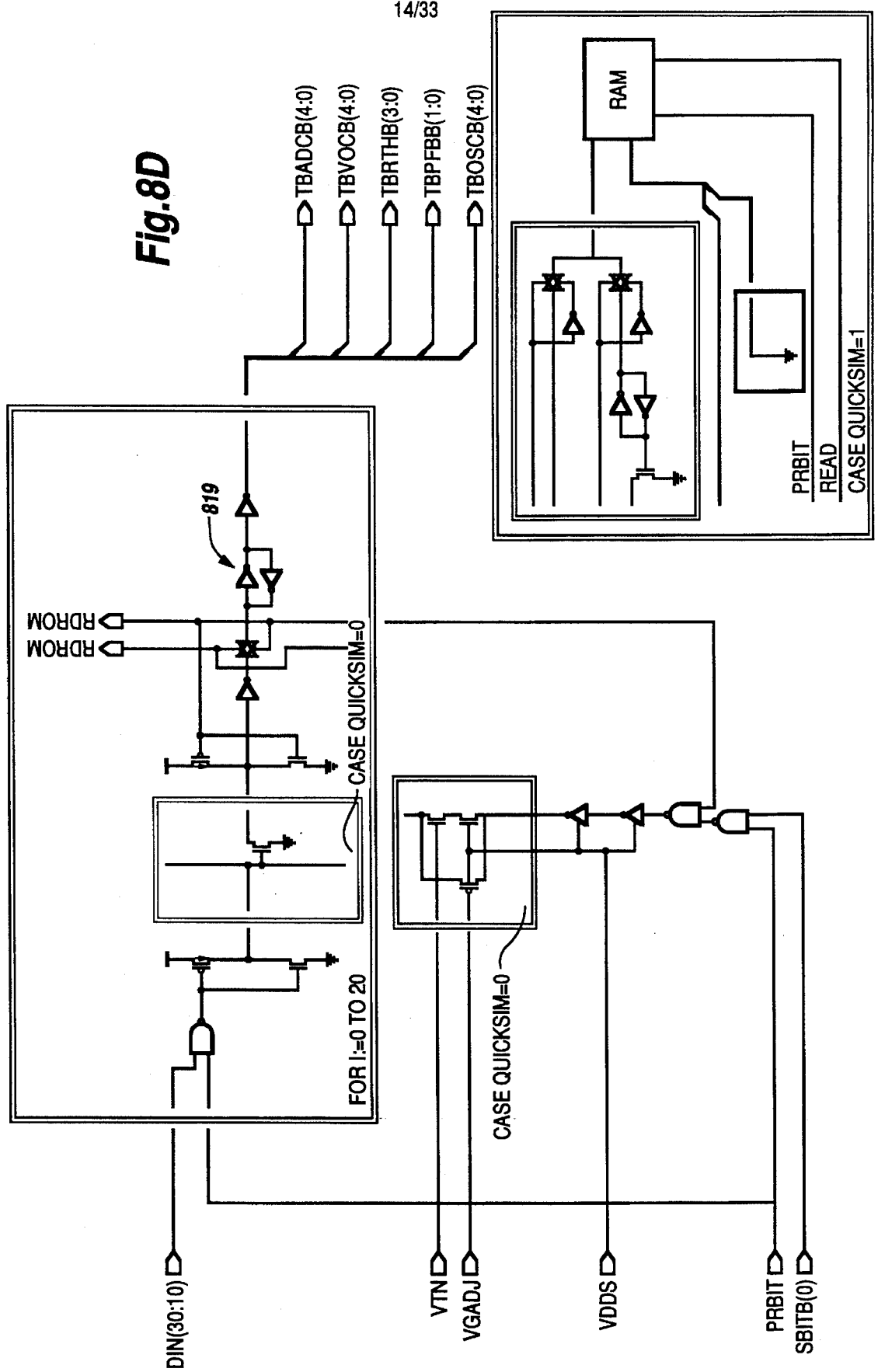

FIG. 8d shows subblock TRIM_BIT which includes the read on start-up 21-bit register which holds the trim values for charger 200. Indeed, the five output data busses contain the trim data as follows. TBADCB(4:0) has five bits of A/D converter block 2 10 subblock VATOD trim in FIG. 10c; TBV$_{OC}$B(4:0) has five bits of trim for resistors 612–613 of FIG. 6; TBRTHB(4:0) holds four bits of trim for the adder in FIG. 7c; TBPFBB(1:0) holds two bits of power fail trim for block PWRCONTROL in FIG. 12a; and TBOSCB(4:0) has five bits of oscillator 218 trim. On power up the READ, READB signals go active to read the cells into latches 819 and thereby apply the bits to the busses.

Figure 8E:
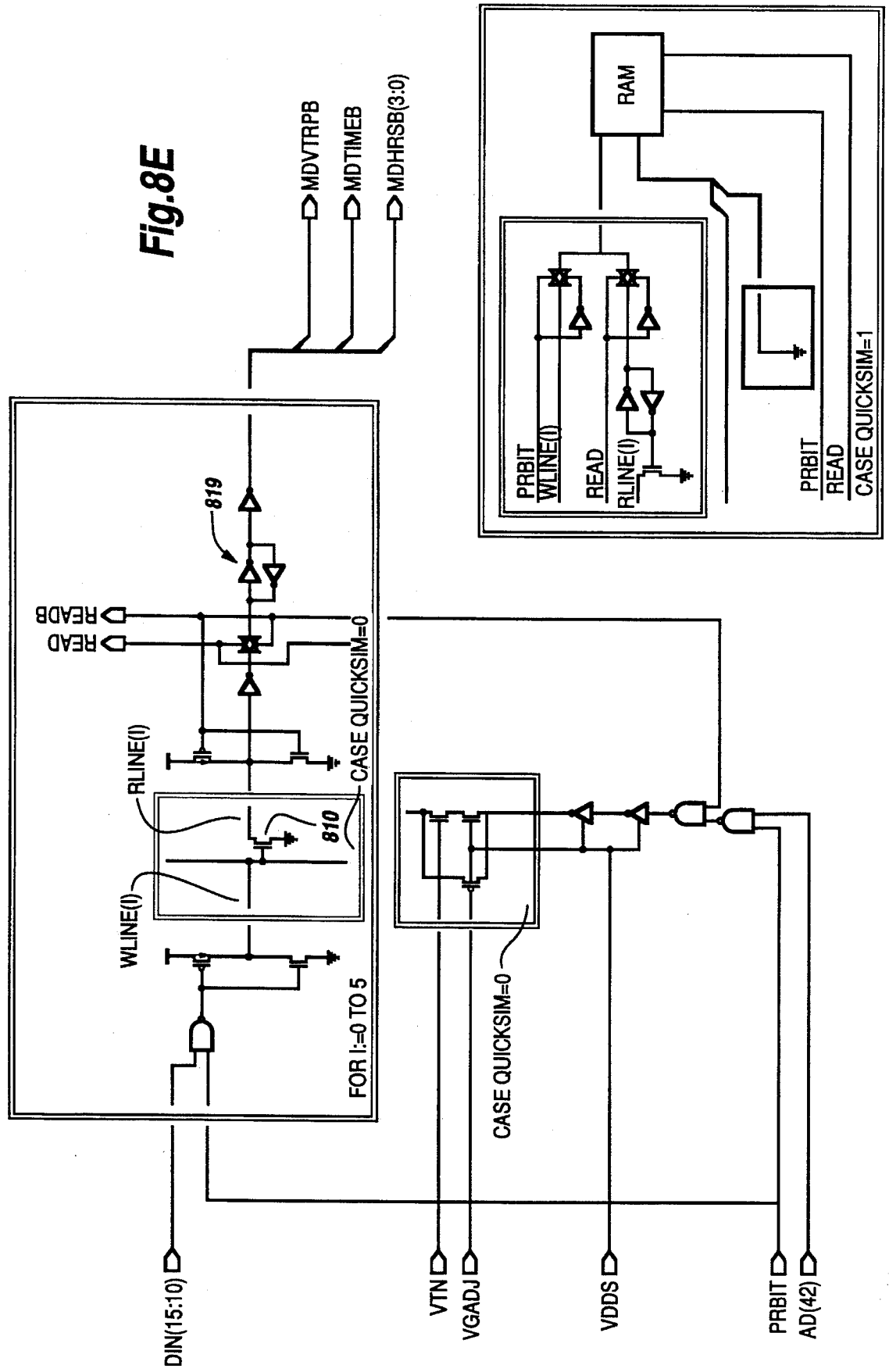

FIG. 8e illustrates subblock MODE_SEL containing the read on start-up register which holds the mode selection values for charger 200. That is, the choice of 5 or 6 volt dc supply (MDVTRIPB bit), timed charging (MDTIMEB bit), and the charge time (four MDHRSB bits) if timed charging is used.

Figure 8F:
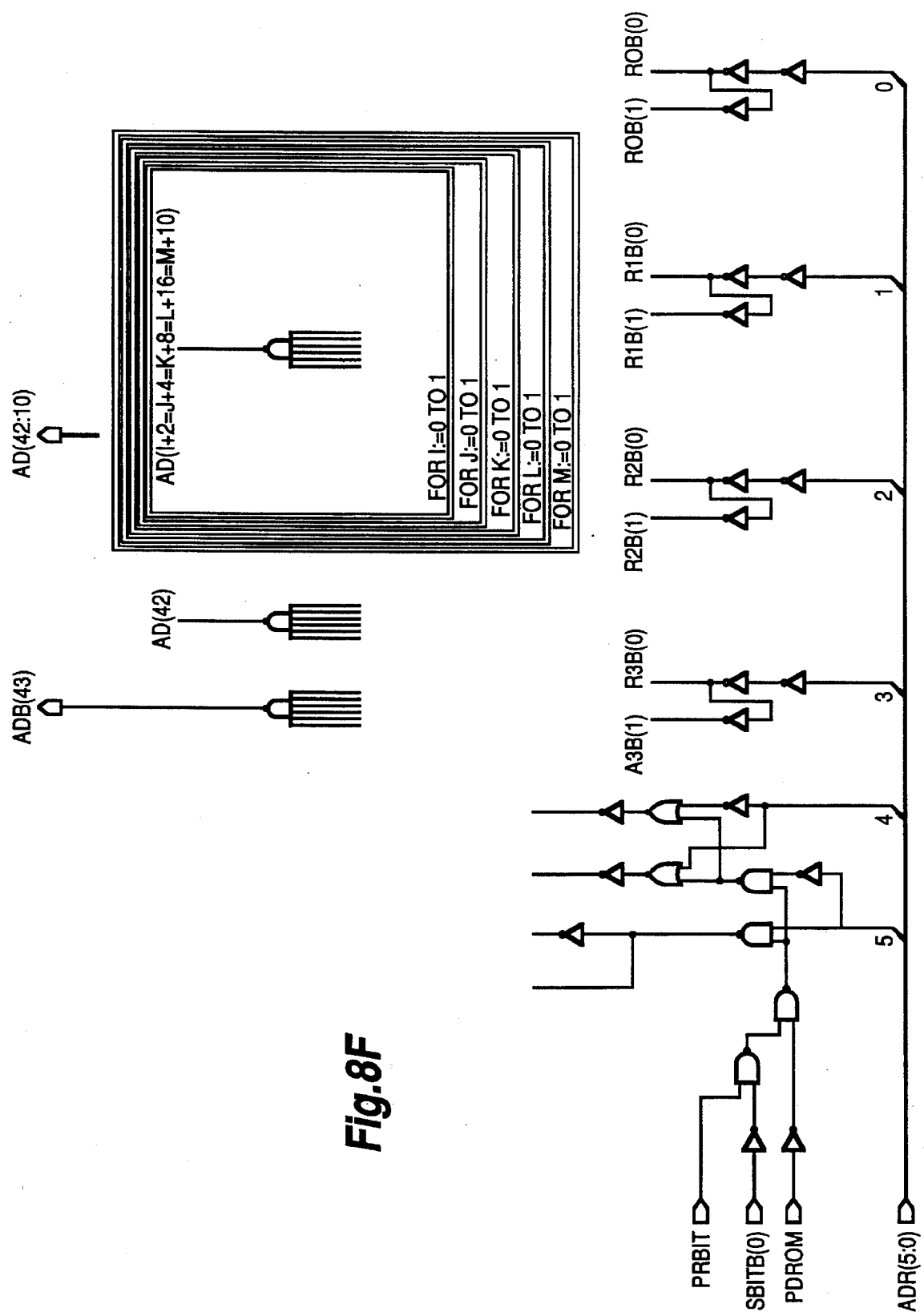

FIG. 8f shows subblock EPROM_DECODE containing a six to 34 demux with an enable to control the gates of the cells in the EPROM array. The gates are enabled when RDROM goes high or PRBIT goes high after SBITB(0) goes to a zero.

Figure 8G:
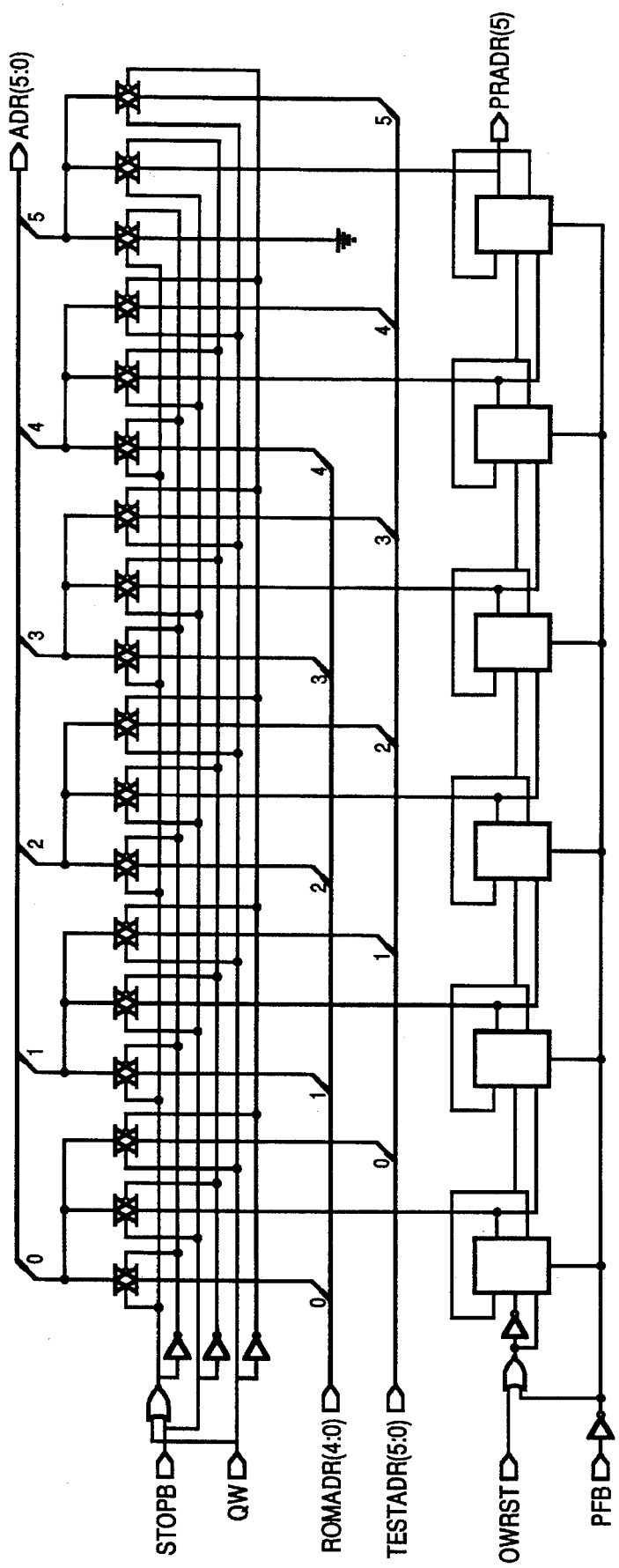

FIG. 8g is a schematic of subblock EPROM_ADR showing the three different busses needed to address the army for programming, testing, and reading. The read addresses are controlled by ROMADR(4:0) and are the normal addresses for operation. The test address comes from the one-wire port and is used when QW goes to a one to signify a test read. For programming, charger 200 generates its own sequential address with a six bit counter. A power-fail resets the counter while a one-wire reset clocks it. The one-wire reset would occur after a programming cycle to clear the registers for the next breakpoint data to be entered.

Figure 8H:
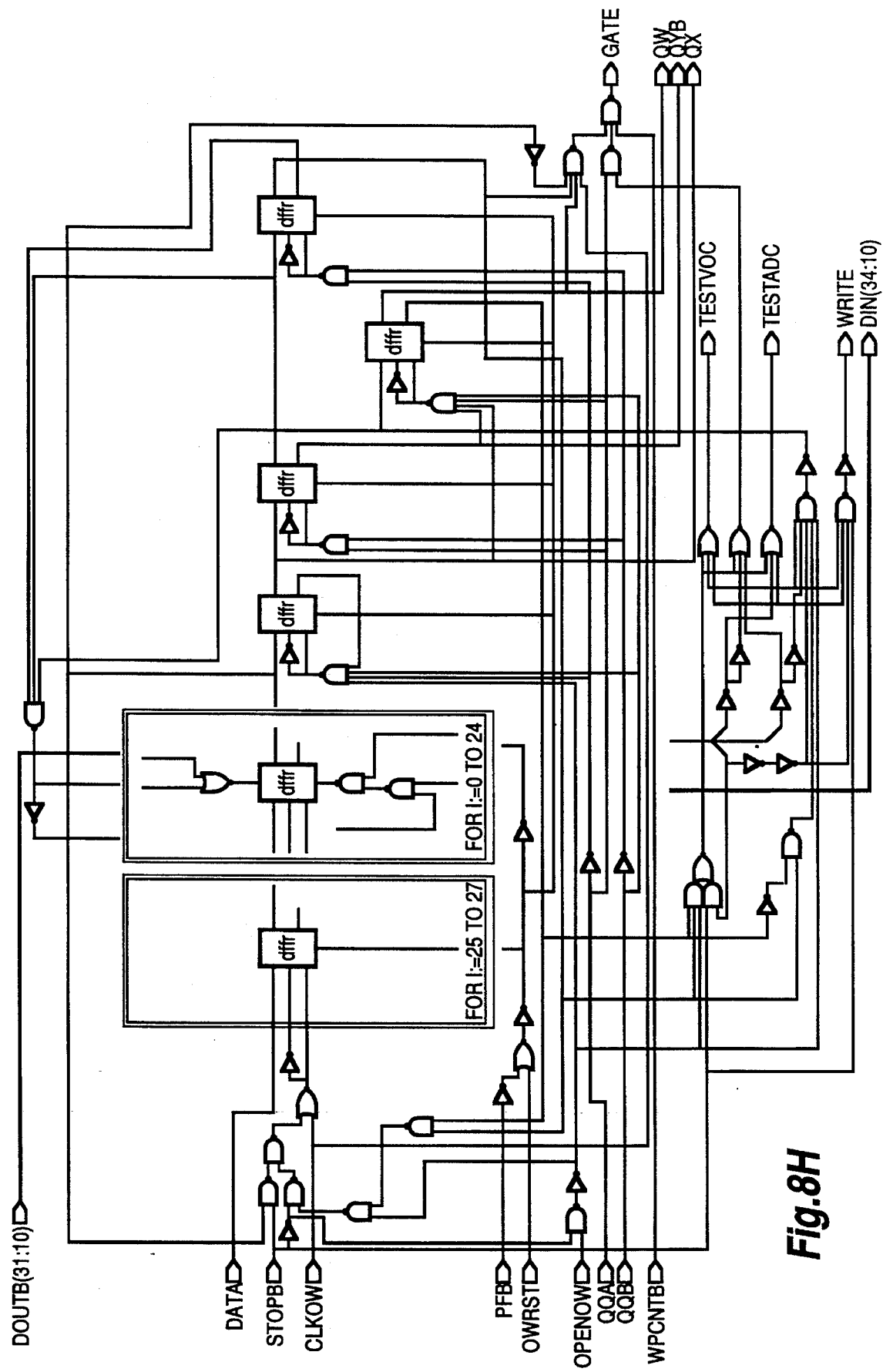
Figure 8L:
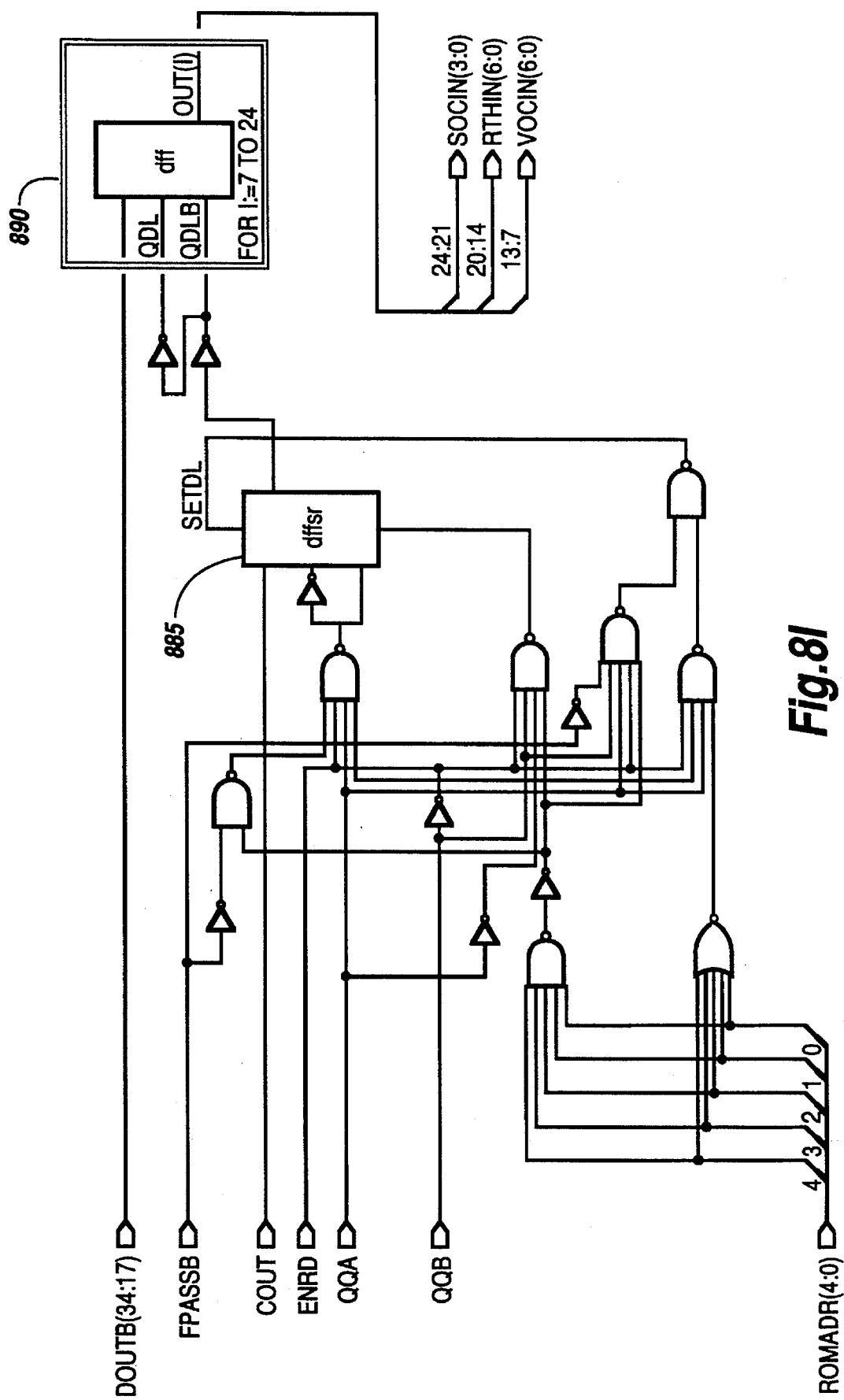

FIG. 8h shows subblock OWDECODE which is essentially a serial shift register with parallel load to convert the three-wire input data into a battery charger 200 word. With STOPB equal to one, the shift register acts as an input only device, but with STOPB equal to zero and OPENOW high, it acts as an I/O register to shift programmed data back out of the one-wire port. When a 1 reaches Q(O) and STOPB=1, the register is locked up and no more data can be shifted in. At this point the circuitry on the bottom decides what function is to be performed by looking at the value of Q(2:1). If it is a write, the DIN(34:10) will be programmed into the appropriate EPROM cells when VBAT is taken to 12 V. Only a power-fail or a one-wire reset will clear the data in the register. The case of OPENOW being a 1 is more complicated since the EPROM cell must be read at the address entered in Q(9:4) and then loaded back into the register thus destroying the previous contents and instruction code. The flip-flops for QX, QY, QZ, and QW create the necessary control signals to perform the required task. Once a 1 reaches Q(O), phase 1 of QQA–QQB will set QX to a 1. (Note that QQA–QQB arise from Timing Generator 212 as shown in FIG. 11b and effectively provide a four phase clock by 50% duty cycle signals QQA and QQB which are π/2 output of phase.) The next phase sets QW to a one if Q(2:1)=11 and causes RDROM to go to a one. QY is set to a one on the third phase and stops RDROM while forcing ENS to a zero and ENR to a one to load the shift register with the output of the EPROM array. The fourth phase sets QZ to a one and stops the reads. All other tests functions perform the same way with OPENOW=1 as with STOPB=1 to allow testing after charger 200 is programmed.

FIG. 8i shows subblock DATA_LATCH which takes the current breakpoint indication from A/D converter block 210 to latch the current data from the EPROM array into the registers which control V$_{OC}$, R$_{TH}$, and the duty cycle. With ROMADR(4:0) at 31 and during phase 1 of QQA-QQB, RSTDL goes high to reset flip-flop 885 and clear QX so it is ready to latch data when the current breakpoint is found. If COUT is high during phase 3 of QQA-QQB, Qx is set high and flip-flops 890 latch the current EPROM data of seven bits setting V$_{OC}$ on bus VOCIN(6:0), seven bits setting R$_{TH}$ on bus RTHIN(6:0), and four bits setting the duty cycle on bus OSCIN(3:0). To make sure something is always latched, SETDL is forced high when ROMADR(4:0) is 0 and QQA– QQB are at phase 3 to emulate QX going high normally with COLIT equal to one. Start-up creates some problems because of the no battery checks so FBASSB causes the data in the first register to be loaded to make sure a valid V$_{OC}$ is available for the no battery check.

Analog-to-Digital Converter

Figure 10A:
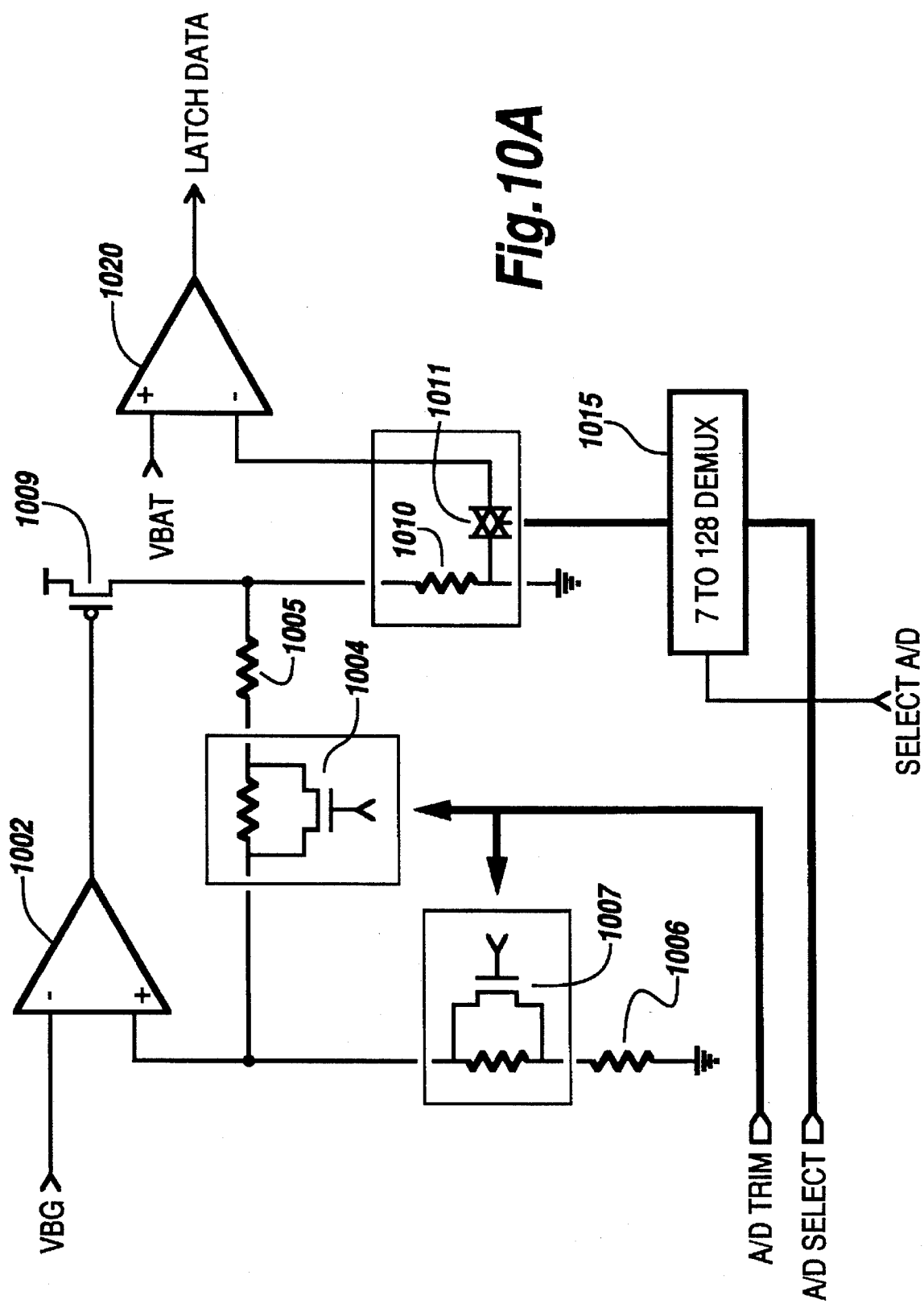

FIG. 10a schematically shows analog-to-digital converter block 210 as including opamp 1002 with feedback resistors 1004–1005 and 1006–1007, PMOS 1009, 128-resistor string 1010 with transmission gate taps 1011 controlled by 7-to-128 demultiplexer 1015, comparator 1020. Block 210 does the comparison of battery voltage at VBAT to the current breakpoint value code read from a register in EPROM_ARRAY and appearing on DBOUT(6:0). Block 210 operates as follows. Bandgap reference voltage of nominally 1.257 volts at VBG feeds the − input of opamp 1002 and the feedback by resistors 1004–1005 and 1006–1007, which have a ratio of 2.74 to 1, feeds the + input. Thus the drain of PMOS 1009 is held at 4.699 volts by the output of opamp 1002; the trim of the resistors 1004 and 1007 insures this voltage level. The 4.699 volts is divided by the string of 128 equal resistors 1010 so that the drop across each resistor 1010 is 37 mV. Demultiplexer 1015 decodes the seven bits of breakpoint voltage $V_{BP(j)}$ code on bus DOUT(6:0) to select one tap 1011 on the string or resistors 1010 to feed the − input of comparator 1020. This selected tap thus applies the selected breakpoint voltage $B_{BP(j)}$ to the − input, and battery charger 200 continues supplying current until the voltage of the battery being charged (at VBAT) reaches $V_{BP(j)}$. The + input of comparator 1020 is terminal VBAT, so when VBAT reaches $V_{BP(j)}$, comparator 1020 and output COUT switch from low to high. This switch triggers a read of the next register in EPROM_ARRAY to lower the resistance of variable resistor 504 and thereby increase the charging current as illustrated in FIG. 4.

Figure 10B:
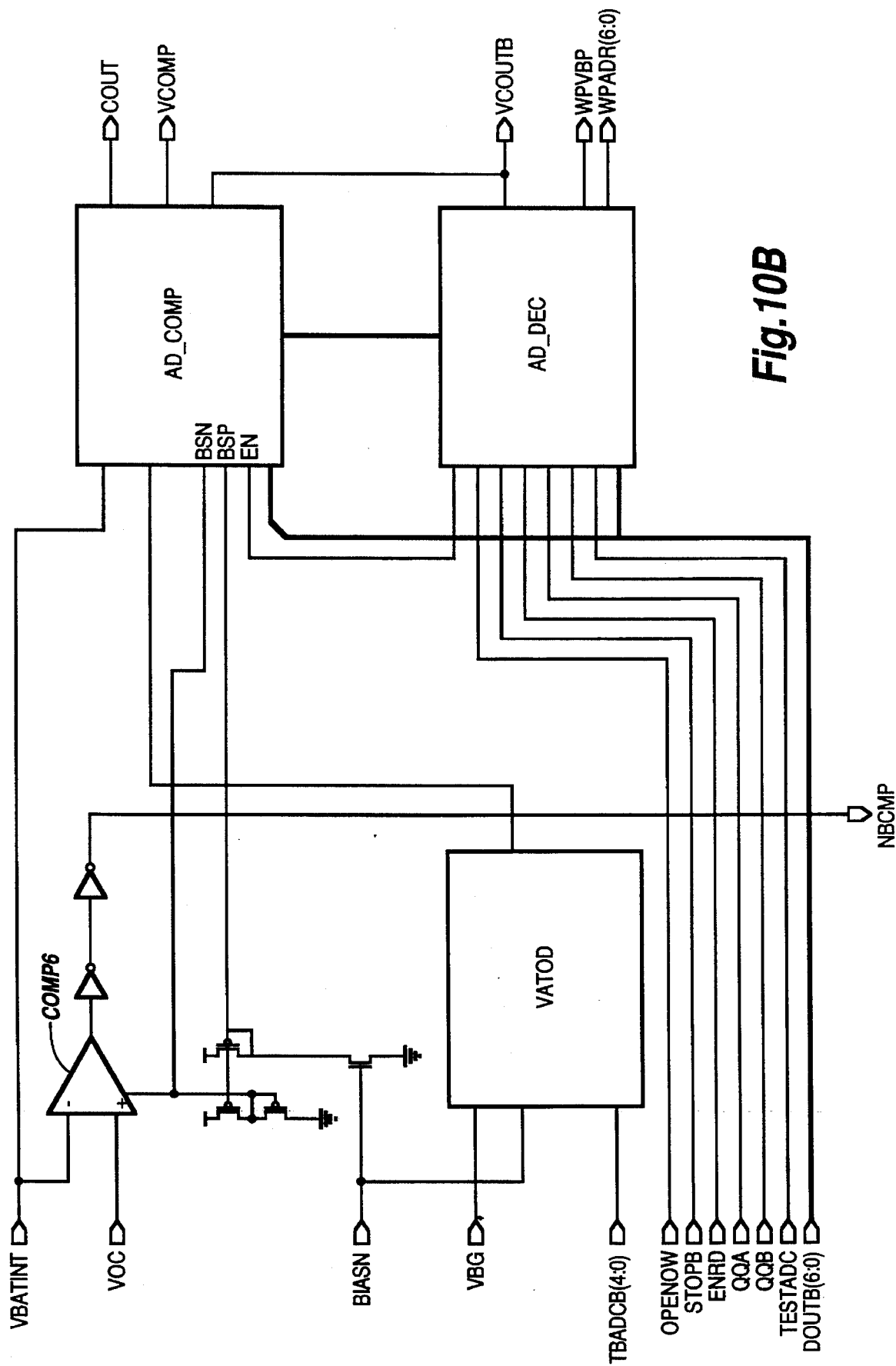

Block 210 also does the check for no battery since all the signals required for this check are in close physical proximity to this block. This check is accomplished by comparing VBATINT and VOC. If they are equal, no battery is attached. BIASN is gained up by a factor of four to speed up the comparitors in AD_COMP. The set-up time is 8 us and the worst case speed of the p-channel comparator is 4 us. FIG. 10*b* shows block 210 composed of subblocks.

Figure 10C:
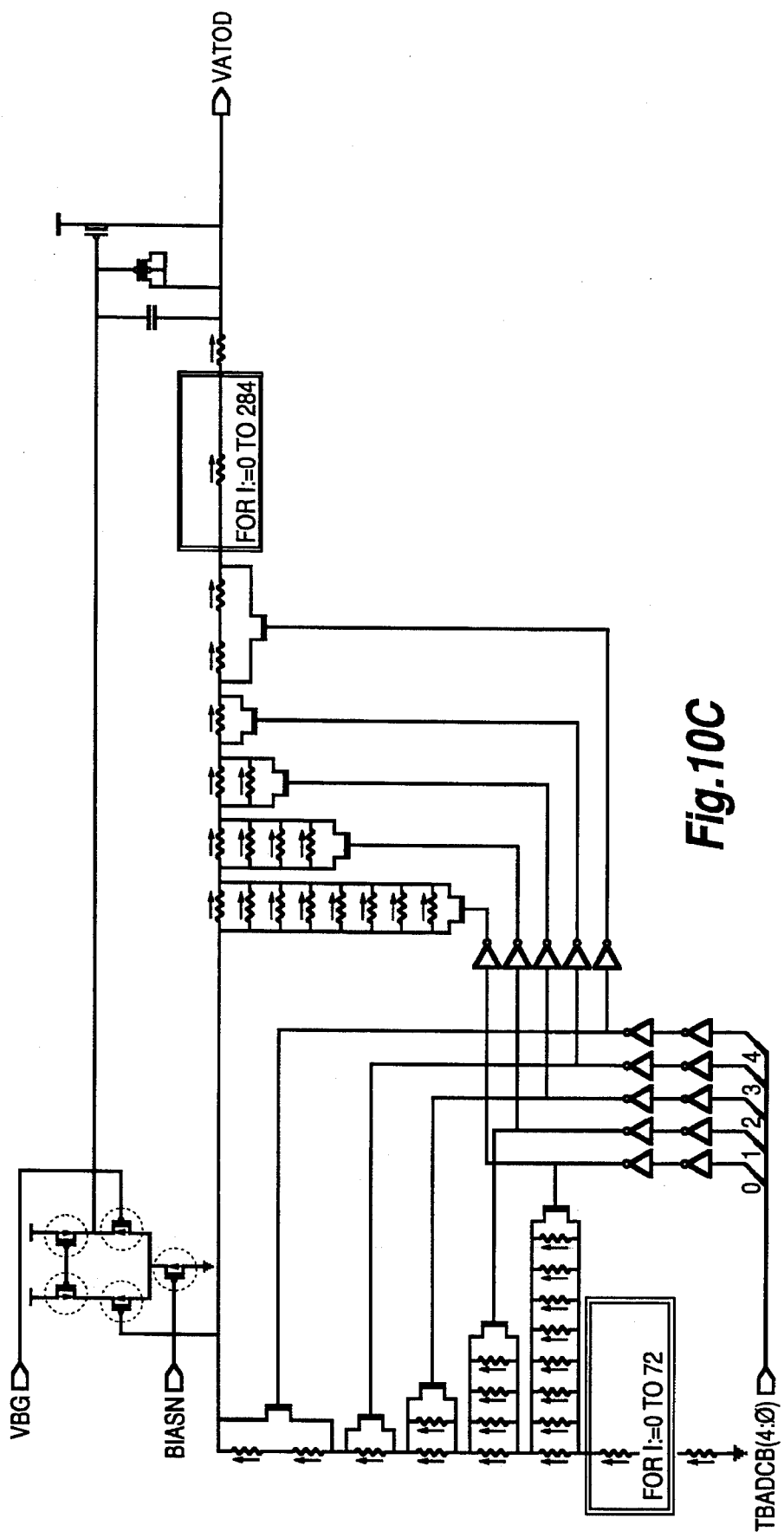

FIG. 10*c* shows subblock VATOD which is similar to block VOC except it is set to a constant output voltage of 4.699 volts (127×37 mV) at node VATOD. The trim is the same but the constant output voltage simplifies things considerably. Note that two non-unit resistors are needed now to make up for the non-unit gain to 4.699 V imposed by using the same trim circuit and resistors as VOC to simplify layout of this subblock.

Figure 10D:
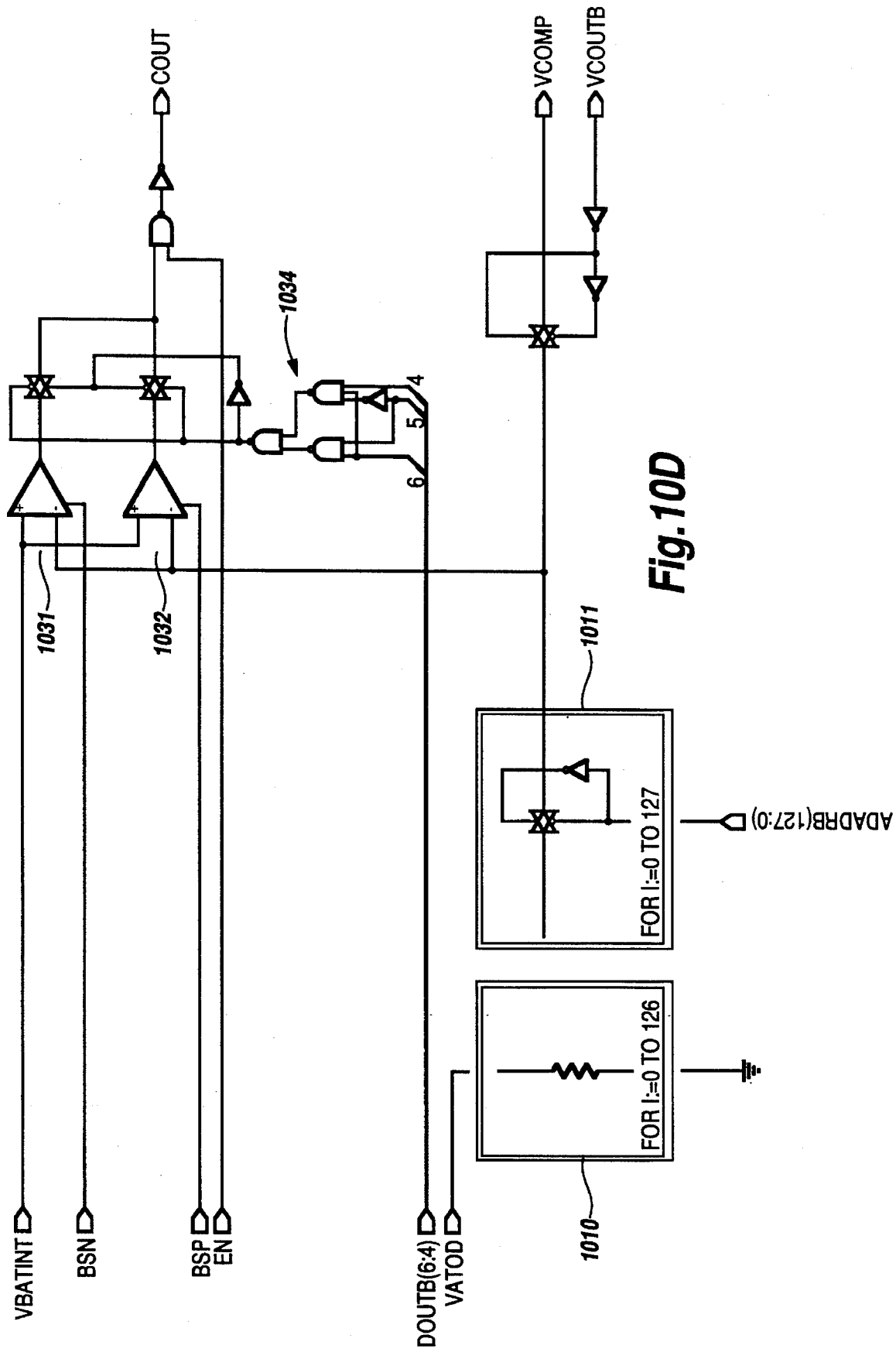

FIG. 10*d* shows subblock AD_COMP which takes the 4.699 volts VATOD voltage and the address (ADADRB(127:0)) decoded from the seven DOUTB(6:0) bits to create VCMP ($V_{BP(j)}$) for comparison to VBATINT (VBAT passed through an ESD protection resistor). The A/D itself is just a string of 127 unit sized resistors 1010 with VCMP set to the voltage at the open transmission gate 1011. VCOMP is the VCMP sent to PWRCONTROL for test purposes, but it has a transmission gate in its path in AD_COMP to keep any signals that cross VCOMP from getting coupled in with VCMP. The gate is only open when TESTVOC or WPVBP is high. An n-channel (1031) and a p-channel (1032) high common mode range input pair comparator are both used because VCMP can go from GND to nearly VDD. The cross over point selecting between the comparators was set to 1.739 V (corresponding to DOUT bits of 101111 and implemented by NAND gates 1034) since this is above the maximum one cell voltage and below the minimum two cell voltage of a NiCad or NiMH battery, so any differences in comparator offset will not cause problems near the final voltage of a battery. The EN (enable) signal forces COUT to 0 to keep from burning current in an inverter following the comparators because the VCMP signal is allowed to float when a conversion is not taking place.

Figure 10E:
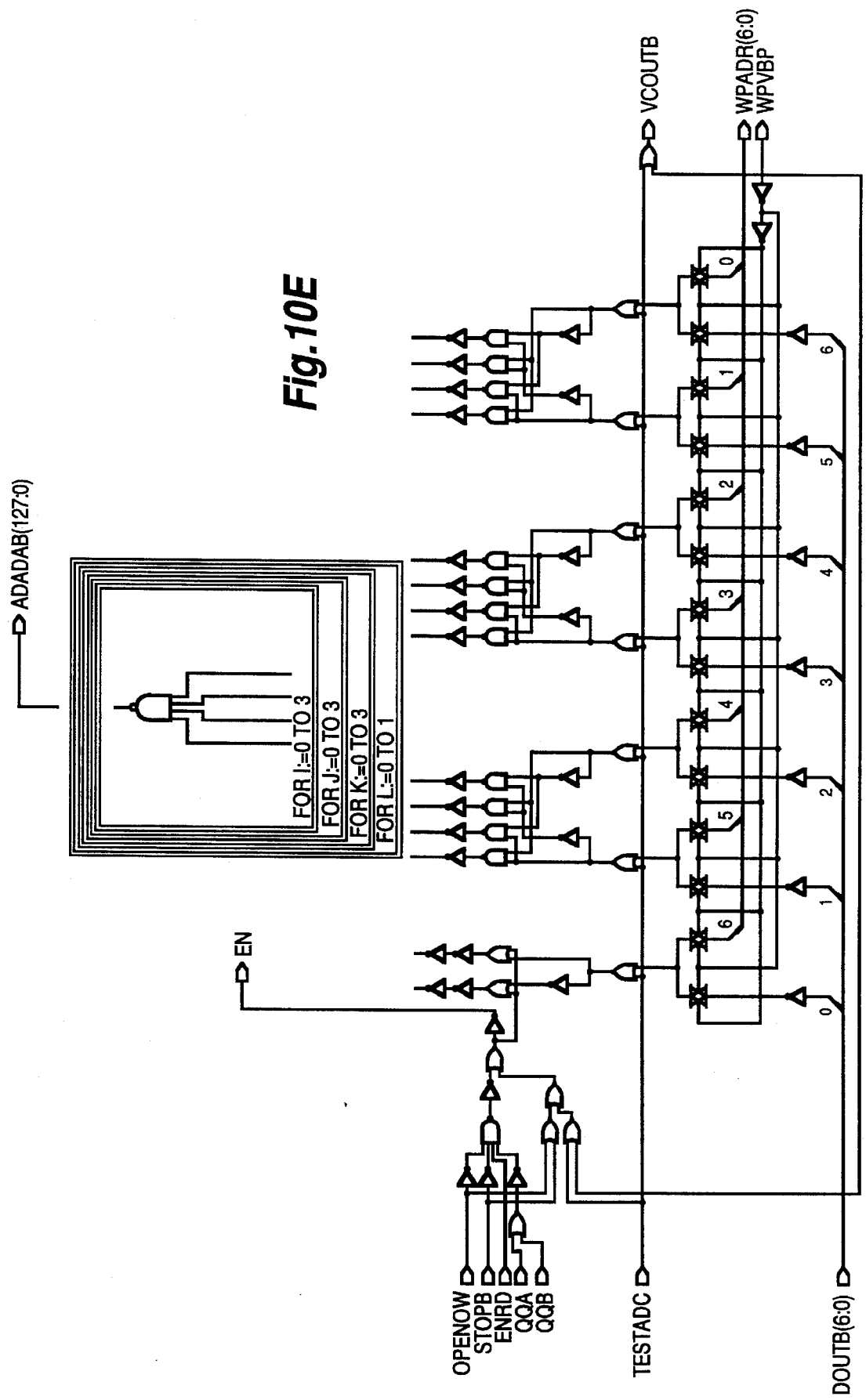

FIG. 10*e* illustrates subblock AD_DEC which takes the encoded breakpoint voltage on DOUTB(6:0) (or test data on WPADR(6:0)) and demultiplexes it for AD_COMP and creates an enable signal (EN) during phases 1, 2, and 3 of the QQA–QQB clock if ENRD is high and STOPB, OPENOW are low. The demux uses a four input NAND with predecoded inputs to save space because four NANDs are approximately the length of one unit resistor in AD_COMP. TESTADC forces the demuxed address to turn resistor 127 on to pass 4.699 V to PWRCONTROL. WPVBP chooses DOUTB(6:0) if it is low or WPADR(6:0) if it is high to go into the decode circuitry.

Figure 10F:
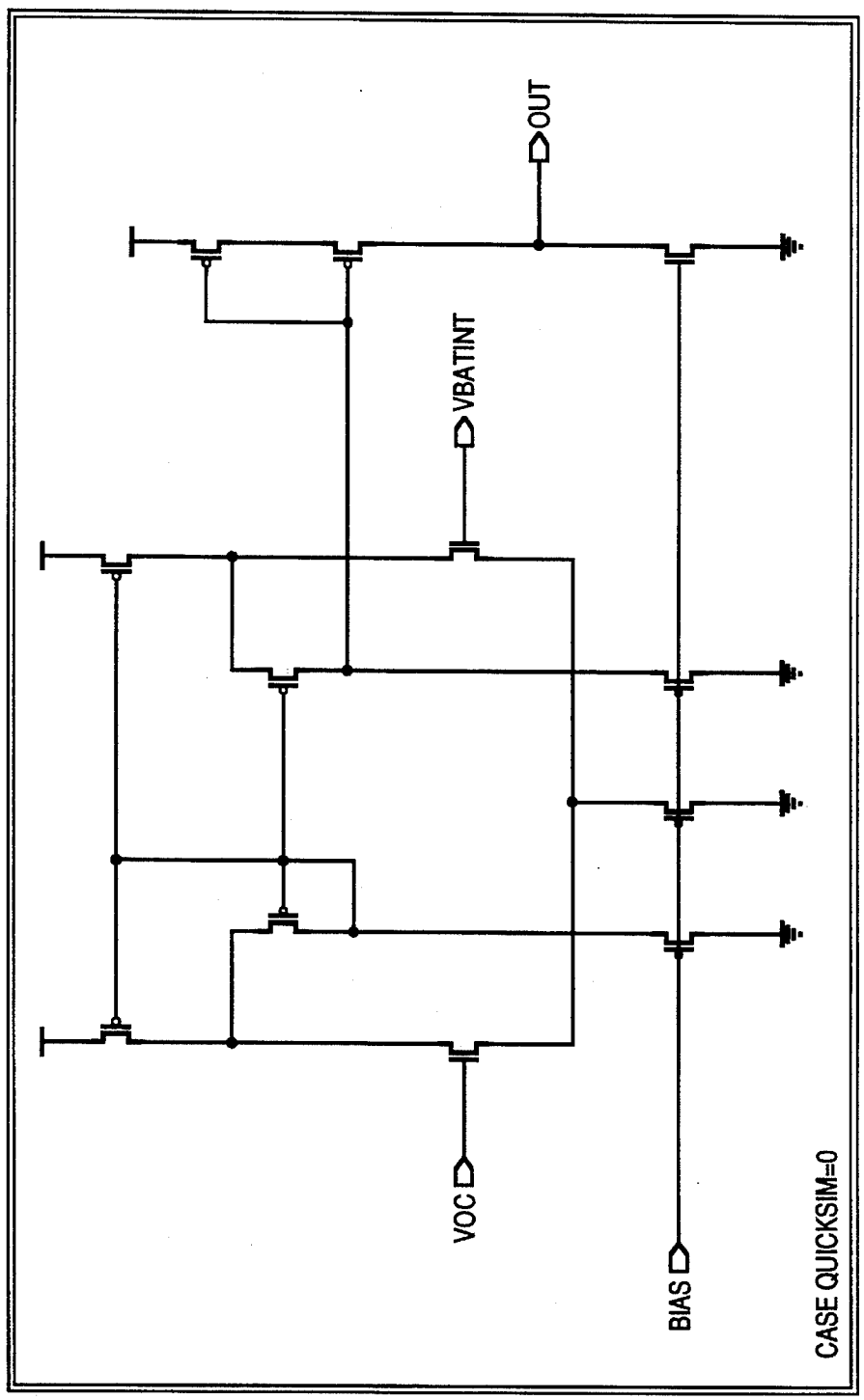
Figure 10F:
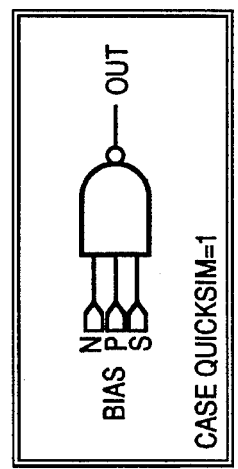

FIG. 10*f* shows comparator COMP6 in FIG. 10*b* as an n-channel input high common mode range comparator with intentional offset to be used for the no-battery comparison. In the case of no battery connected to VBAT, no charging current flows through $R_{TH}$, so VBATINT equals VOC. But looking for voltage equality is impossible, so an offset to make VBATINT look higher than VOC to the comparator is used in COMP6. The input differential pair is laid out as a 3 by 3 array of n-channel devices using only seven of them (four for the + input and three for the − input) to allow for a metal option to change the offset if needed. Currently the offset is set at 20 mV in the typical case; this is roughly 1 kT (26 mV at room temperature).

Timing Generator

Figure 11A:
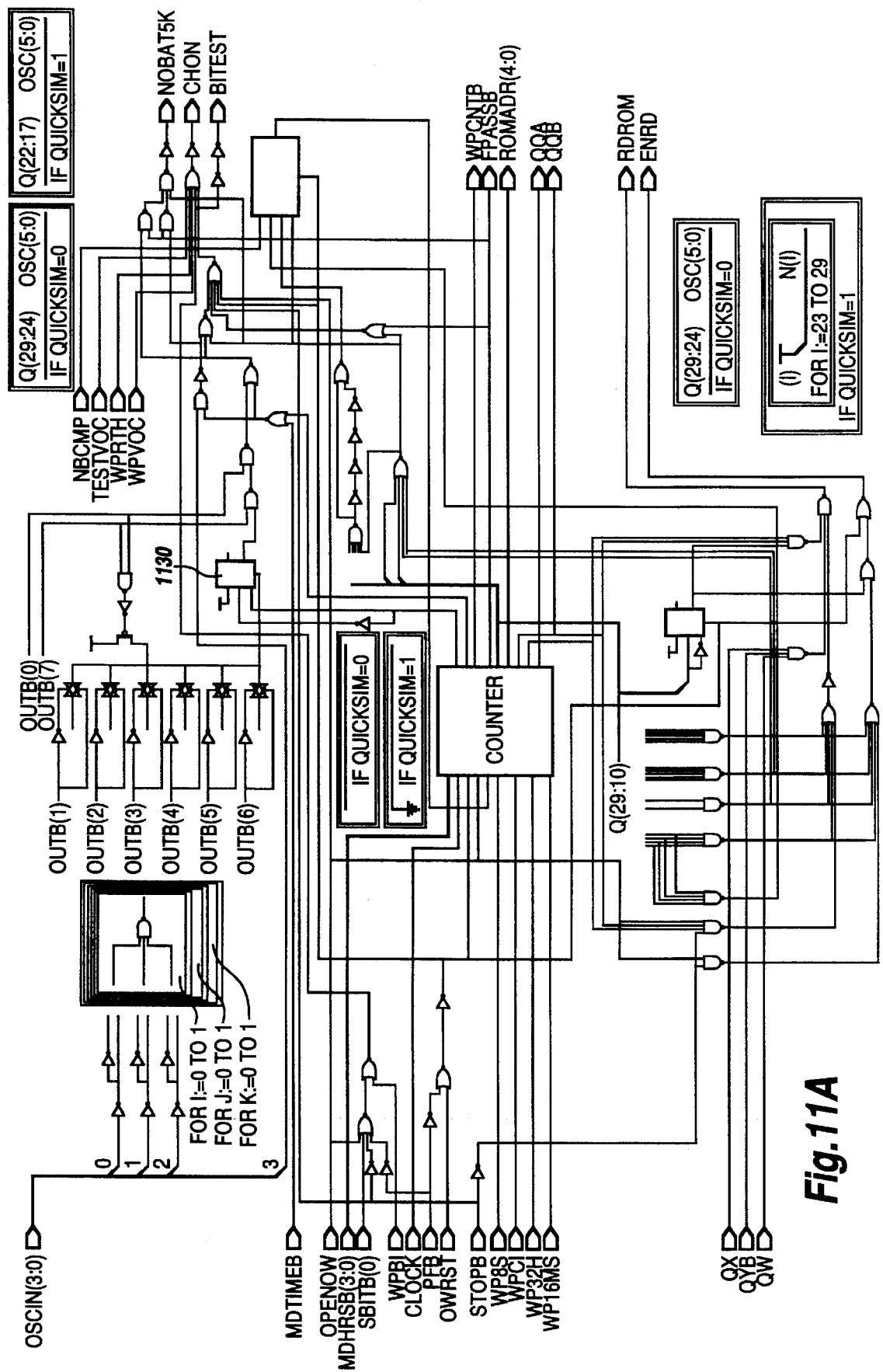
Figure 11B:
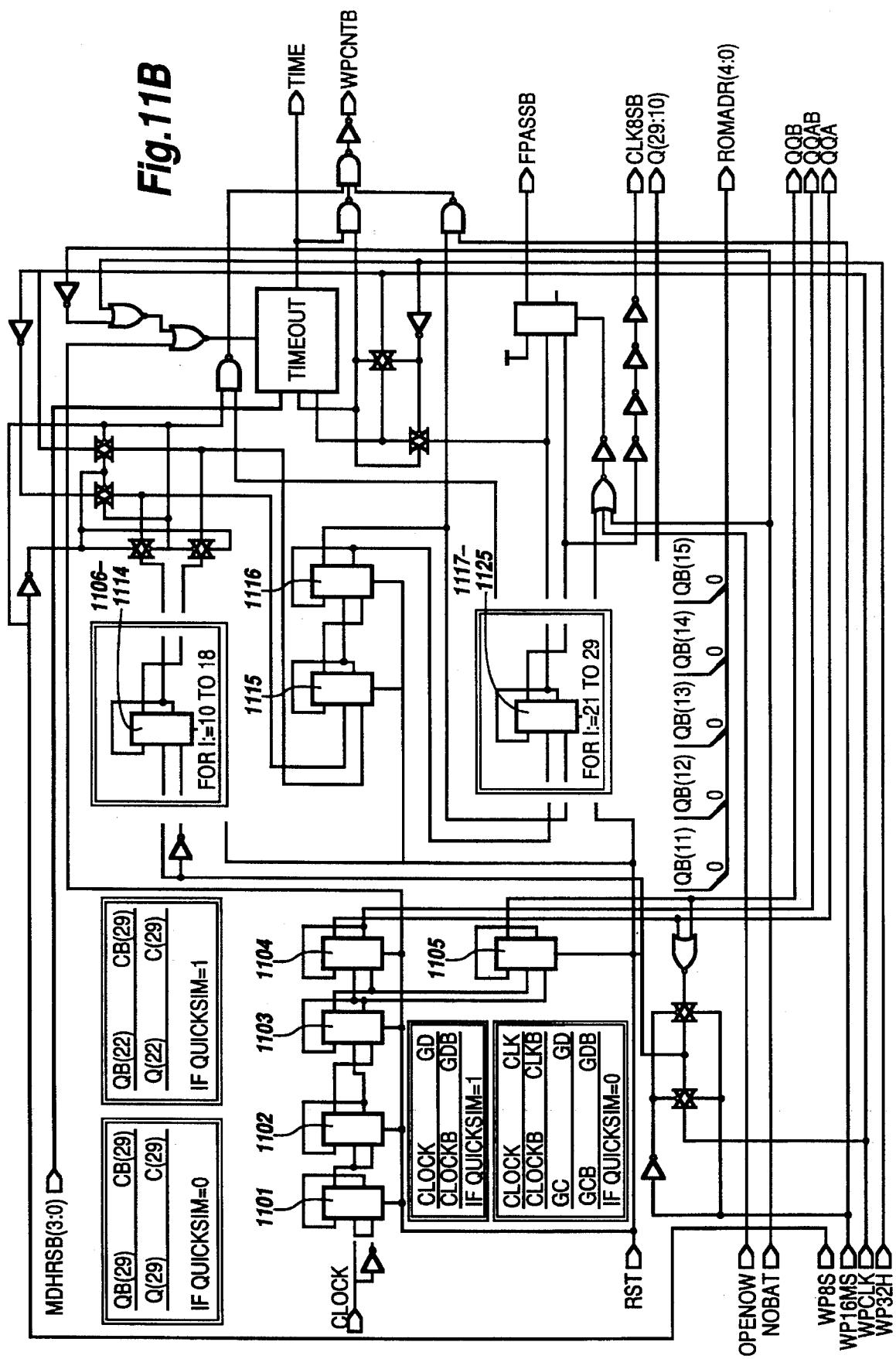

FIG. 11*a* shows Timing Generator block 212 which controls the main operation of charger 200; in particular, CHON high turns on the battery charging. The Counter subblock (see FIG. 11*b*) outputs the Q values of a large counter chain made of flip-flops 1101–1125 to set up the RDROM cycle and successively output the thirty-two register addresses with ROMADR(4:0) at the end of each eight second interval. RDROM is created by a simple NAND/ NOR decoder to find the end of each cycle. OSCIN(2:0) is decoded by a NAND decoder to control reset of flip-flop 1130 (RSTCHON) which controls CHON. If OUTB(7) is a zero, CHON is forced high while if OUTB(0) is a zero, CHON is forced low. The intermediate values are controlled by COUNTER. At the beginning of the eight second cycle flip-flop 1130 is clocked high forcing CHON high. The decoder passes a Q value from COUNTER to RSTCHON so that when Q goes high RSTCHON is forced high and CHON is forced low to create the desired duty cycle. CHON has several other controls. The tests modes directly force CHON to a 1 and override all other signals, but the checks for no battery complicate things. If OSCIN(3)= 0 with TIME=1 (timer running) or if the OSCIN(2:0) decoder=0 with TIME=0, CHON is forced high and NOBAT5K is also forced high. This situation is necessary to check for no battery since a $V_{OC}$ must be applied but the highest resistance must be applied to avoid charging when it is not supposed to be. RDNOBAT is the once a second signal for no-battery checking, while CLKNOBAT is four one-shot signals during RDNOBAT for the no battery sampling circuitry.

FIG. 11*b* shows subblock COUNTER which takes the 1 us output of the Clock and turns it into the 8 second cycle with ROM addresses, the first pass signal (FPASSB) for initialization, and the TIME signal indicating an expiration of the programmed charging time period of up to 32 hours. This involves many flip-flops. The apparent complexity comes from the need to test the counter chain for bad bits by breaking into the chain at specified intervals with wafer probe signals.

The circuitry TIMEOUT in COUNTER takes the 8 second count and turns it into the charging time period set by MDHRSB(3:0) if the timer is enabled in the mode select bits. Two hours is 900 times 8 seconds which happens to be 15×15×2×2. This is accomplished with a 4 bit counter that resets itself at the beginning of the 15th count to make a divide by 15 instead of divide by 16 as with a normal 4 bit counter. Two of these are paired together along with two more flip-flops to make a divide by 900. A decoded MDHRSB(3:0) sets up the correct number of hours for the timer to be on. A flip-flop clocked by CNT with D set to VDD keeps TIMEOUT from going high after zero hours. After that the outputs of the counter flops are compared to MDHRSB(3:0) to find when the correct time has been reached.

The subblock NOBAT is the digital logic to convert NBCMP from comparator COMP6 (see FIG. 10*f*) into a usable no battery comparison. When RDNOBAT is high, CLKNOBAT clocks the two flop counter only if NBCMP is high. This provides the sampling since both outputs must be high which means the flops must be clocked three times so NOBAT can remain high after the fourth clock.

Power Control

Figure 12A:
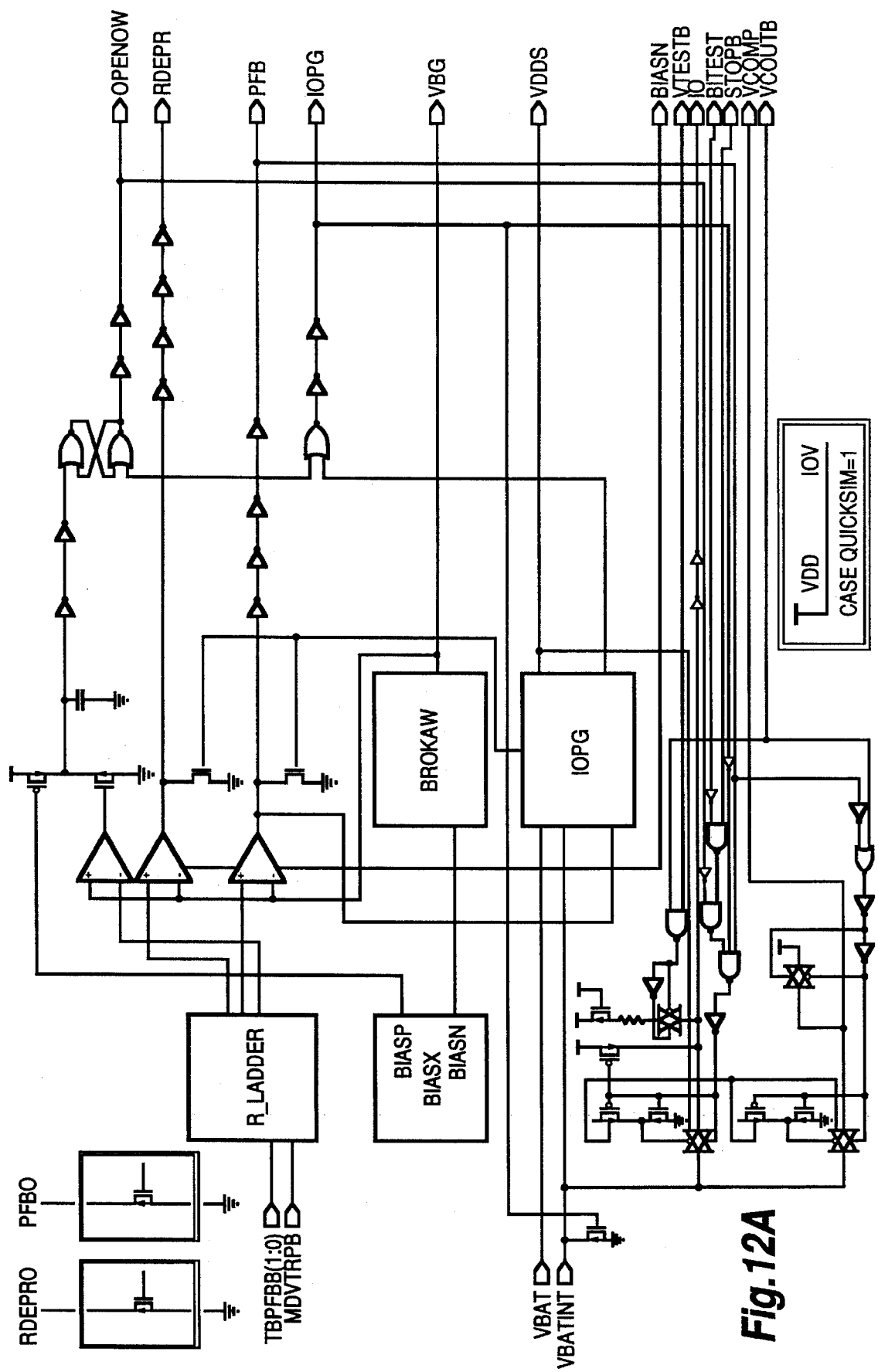

FIG. 12a shows block PWRCONTROL which does all the power level detection and control and also contains the logic to multiplex the test signals onto VBAT. VBG is used as the comparison level for OPENOW, RDEPR, and PFB. When VDD gets to about 7.7 V, the top comparator output goes to a 0 and turns off the n-channel. The capacitor on OPX starts to charge until it reaches Vtp in about 350 us, then sets the latch forcing OPENOW high. This latch is reset on a power-fail. The next comparator creates RDEPR which is for reading the EPROM start-up bits and starting the oscillator when VDD reaches 4 V. This is done since PFB is trimmed by EPROM bits so PFB cannot be used to read bits to trim itself. PFB is the normal start-up, shut-down power level which is set at 5% of either 5 V or 6 V. Both the RDEPR and PFB comparitors have pull-downs on the outputs to keep them in a known state during power-up until the comparitors start up and can overdrive the pull-downs. The signal IOPG goes high if VDD is above power-fail and VBAT is above VDD. This indicates a programming condition. It can also indicate a start-up without a battery since VBAT can be capacitively coupled up to VDD. A thick oxide pull-down was put on VBATINT with IOPG as the gate to drawn current from VBAT when IOPG is high. This will not hinder programming since the current is less than 100 uA. The control of VBATINT into charger 200 is complicated looking but straight forward in concept. The one-wire port is open when STOPB=1, BITEST=0, or OPENOW=1, and power is valid (PFB=1) and battery is less than VDD (IOPG=0). The port is closed off during programming to keep 12 V out of the inside of charger 200. When the port is closed, IOX is pulled to VDD, but when it is open the test modes control the internal pull-up. If charger 200 is in an RTH/VOC or ADC test mode the pull-up must be disabled to keep from loading the test voltage. During an ADC test mode the bottom transmission gate is open to allow VCOMP out onto VBAT. Normally VCOMP is pulled high to force it to a known state and to keep the Vds of the transmission gate under 7V during programming. The pull-up can only take IOX to VDD-Vtn to keep VBATINT from bouncing up to and above VDD possibly causing a false power switch condition. IOX is conditioned by a Schmitt trigger to keep any bouncing of VBAT from causing false writes into the one-wire port.

Figure 12B:
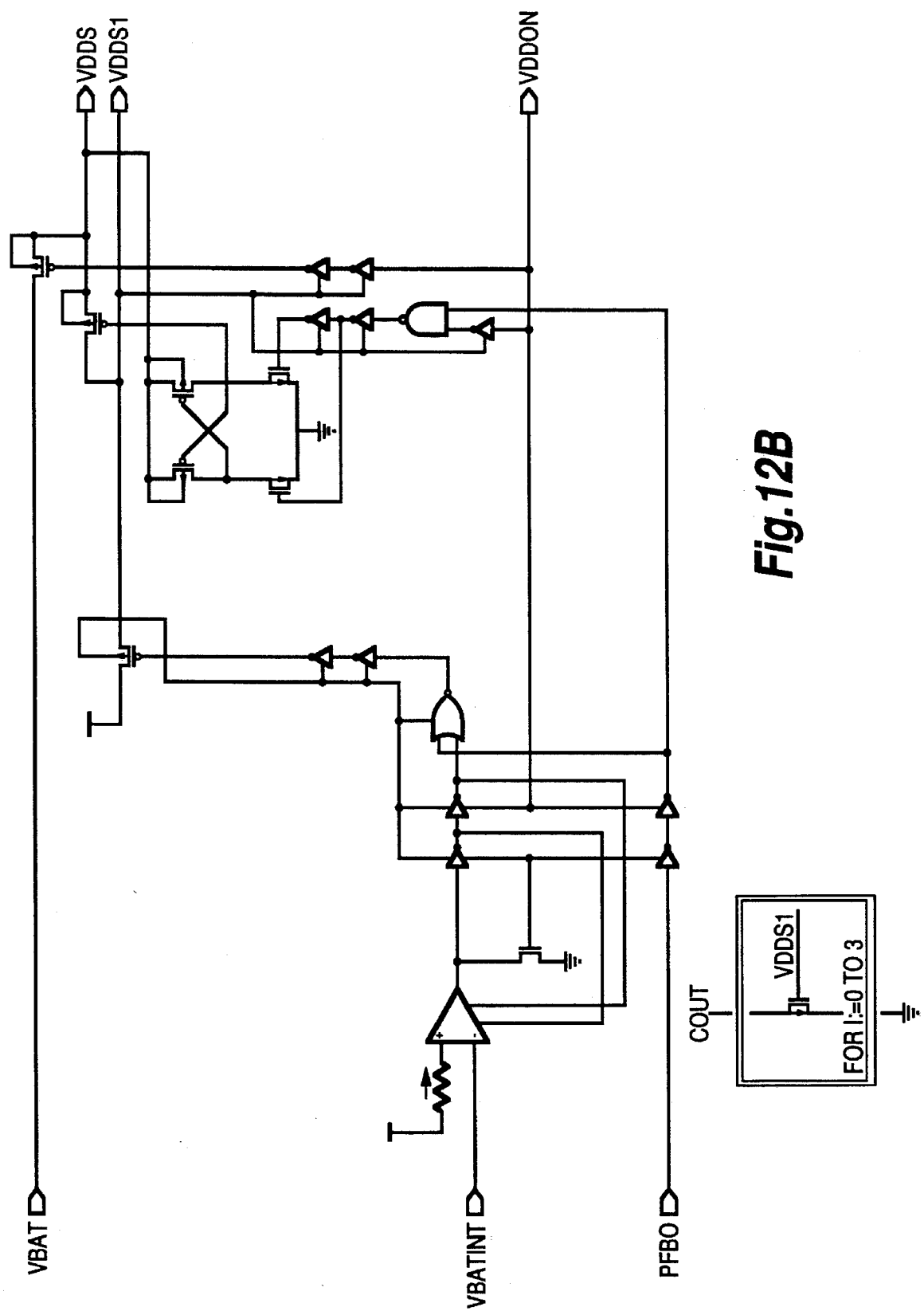

FIG. 12b shows subblock IOPG which performs the power switching function of charger 200. It is complicated by the need to change from VDD to battery at voltage levels from a nearly dead NiCad at 1 V to programming at 12 V. The circuitry needs to be active at all times when a voltage is present on VDD or VBAT, but thick oxide devices to support the 12 V will not work at 1 V so the back-up supply was split into two pieces; VDDS1 is VBAT as long as VDD is below power-fail, but remains at VDD when VBAT goes above VDD if PFB=1 to keep this supply level at or below 7 V while VDDS is always the highest of VDD or VBAT. VDDS1 only goes to IOPG and pull-downs in PWRCONTROL so it is tunneled in poly because it is impossible to extract VDDS1 around VDDS, GND, VDD, and VBAT. Only three p-channels are needed to provide power to VDDS and VDDS1. Two are always on and one is off. The thick oxide level converter is needed to keep VDDS1G at 12 V during programming to isolate VDDS1 and VDDS.

PFBO: PFB comparator output. This signal is needed since it does not pass through any VDD powered logic.

COUT: Comparator output. COUT=1 if VDD is higher than VBAT.

VDD1G: VDD p-channel gate.

VDDS1G: VDDS to VDDS1 p-channel gate.

VBAT2G: VBAT p-channel gate.

Figure 12C:
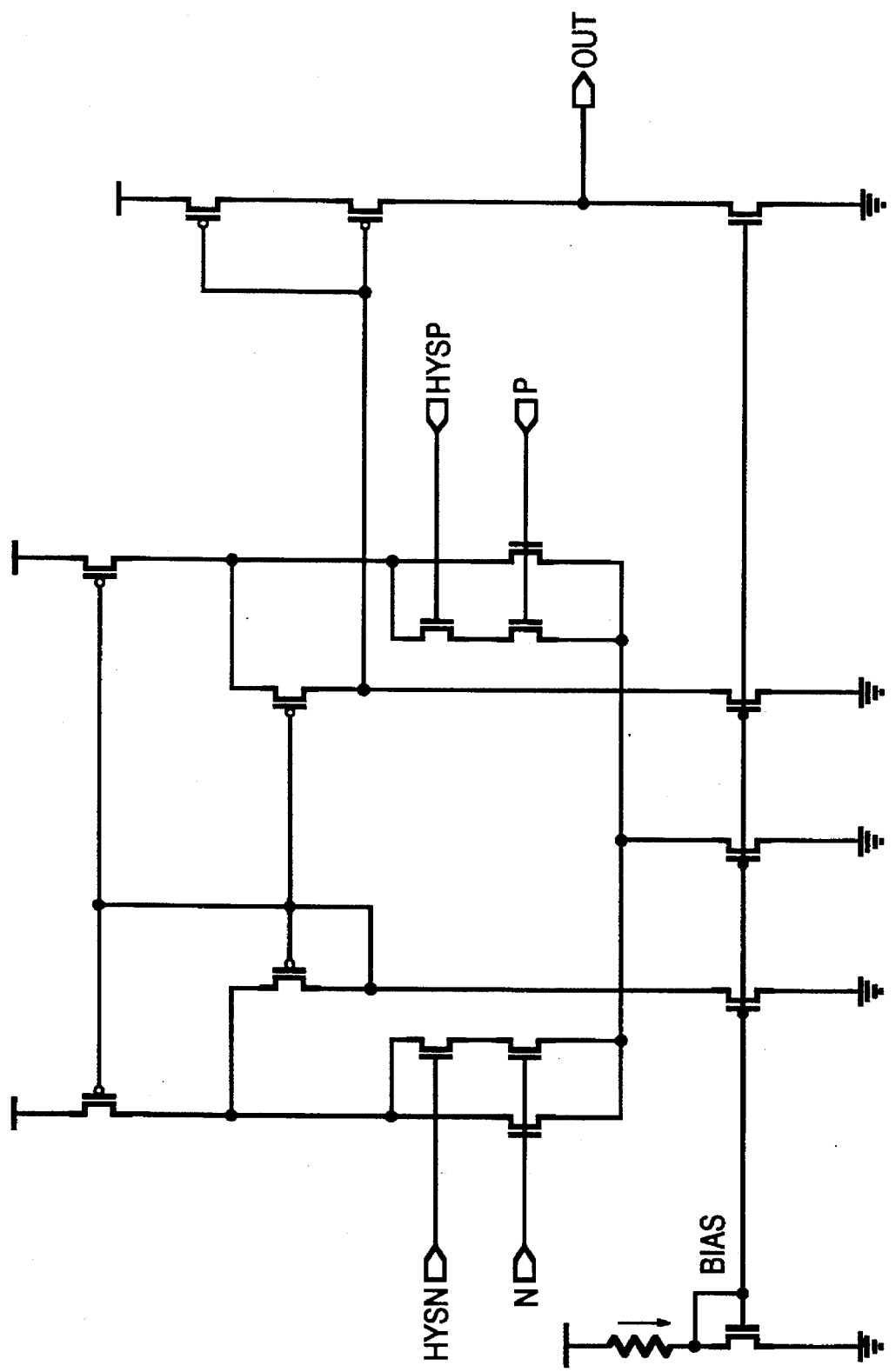

FIG. 12c shows comparator COMP1 used in IOPG and which has several features. The bias circuit is a simple n-channel current source for immediate start-up. The variation of the bias current over VDD and temperature is not important to this circuit since it does not need to be fast and power consumption is not a real issue. The comparator itself is a high common mode amp with hysteresis and intentional offset. The hysteresis is to keep switching noise from rattling the output and the intentional offset is to make the switch to and from VBAT to VDD 200 mV above VDD. This was necessary to keep a fast dropping VDD with a 1 V battery from missing the switch point because of the drop-out of operation of the following inverters which control the p-channel power switches.

Subblock BROKAW is the bandgap circuit to set up the temperature independent voltage VBG. The current ratio is set to 3 to 1 and the transistor size ratio is at 7 to 2. The temperature independent point gives an R1/R2 of 51/24 and a VBG of approximately 1.22 V. The RC filter on the output is to help power supply rejection at 1 Mhz which is the frequency of the onboard oscillator.

OPAMP1 drives VBG in BROKAW and is a normal two stage n-channel input opamp. The compensation is provided by a zero canceling resistor and both ndepletion and pdepletion capacitors to compensate for the dip in capacitance observed for these devices. The bandwidth was limited to about 100 kHz to compensate the loop since the next poles are due to the npn transistors at 1 MHz.

The VDD-referenced trip points are set up by the resistor divider R_LADDER. Transmission gates set up the trim and the 5 V or 6 V trip point selection for power-fail.

One Wire Convert

Figure 13:
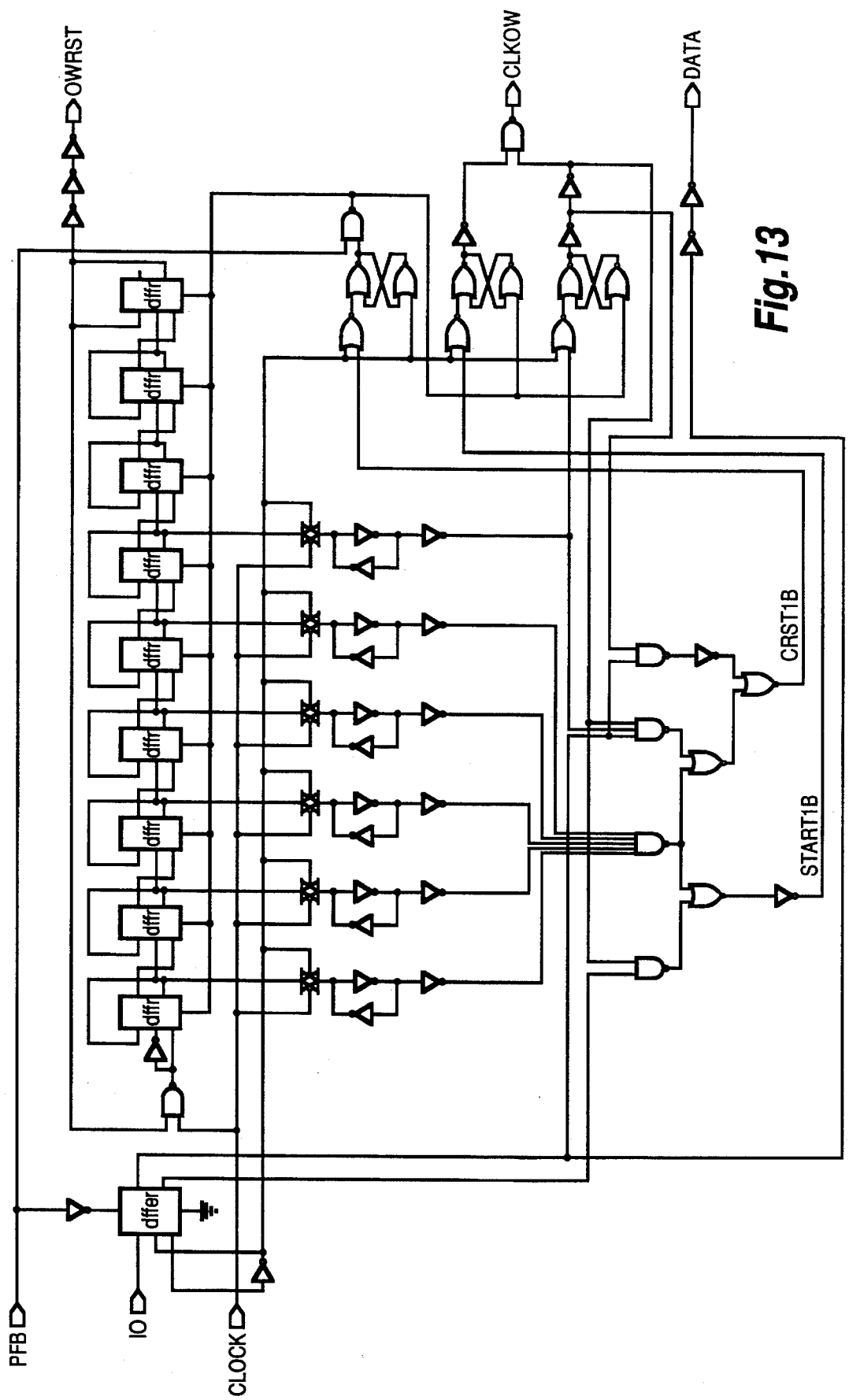

FIG. 13 shows block 216 OWCONVERT for input/output using the one wire approach through terminal VBAT. Because charger 200 has a system clock, a synchronous state machine was designed to decode the one-wire port. IO is sampled and latched by CLOCK and is DATA. Once DATA goes low, the counter is started for 32 cycles and CLKOW is forced low. After the 32 cycles CLKOW is forced back high and if DATA is now high the counter is reset and the state machine begins looking for DATA to go back to a zero to start the cycle over. This is a one input. But if DATA is still low the counter keeps going until it goes back high. If this happens before the last flop is set to a one, charger 200 sees this a zero input. If the counter runs to the end it stops and sets OWRST to a one to indicate a reset cycle. OWRST is not removed until DATA returns to a one.

Clock

Block OSC 218 is an oscillator with temperature compensation and trim. The basic oscillator uses cross-coupled ring oscillators with capacitor charging through a resistor in both branches for the time delay. Trim consists of adjusting the capacitance by a binary weighted array of capacitors for each branch. The five bits on bus TBOSCB(4:0) (Figure 8d) each drives NMOS pass transistors connecting trim capacitors to the primary timing capacitors. U.S. Pat. No. 4,868,525 shows a temperature compensated version with fuses for trimming and is hereby incorporated by reference.

Testing and Programming

Charger 200 may be packaged as a TO-220 three pin part, and this makes the charger easy to use but awkward to test and program. The VBAT pin doubles as a one-wire port for packaged testing or as a Vpp programming voltage pin for programming. U.S. Pat. No. 4,983,820 contains a description of the one-wire communication protocol and operation and is hereby incorporated by reference. FIG. 2b shows five extra pads for wafer probe testing: WPCLK acts as a clock to a test counter which control the addresses to $V_{BP}$, $V_{OC}$, and $R_{TH}$ or as a clock to sections of other internal counters; WP1, WP2, and WP3 are to set particular values of $V_{BP}$, $V_{OC}$, and $R_{TH}$; and NBCMP is to test comparator COMP1 by checking for VBAT near VOC.

Figure 14:
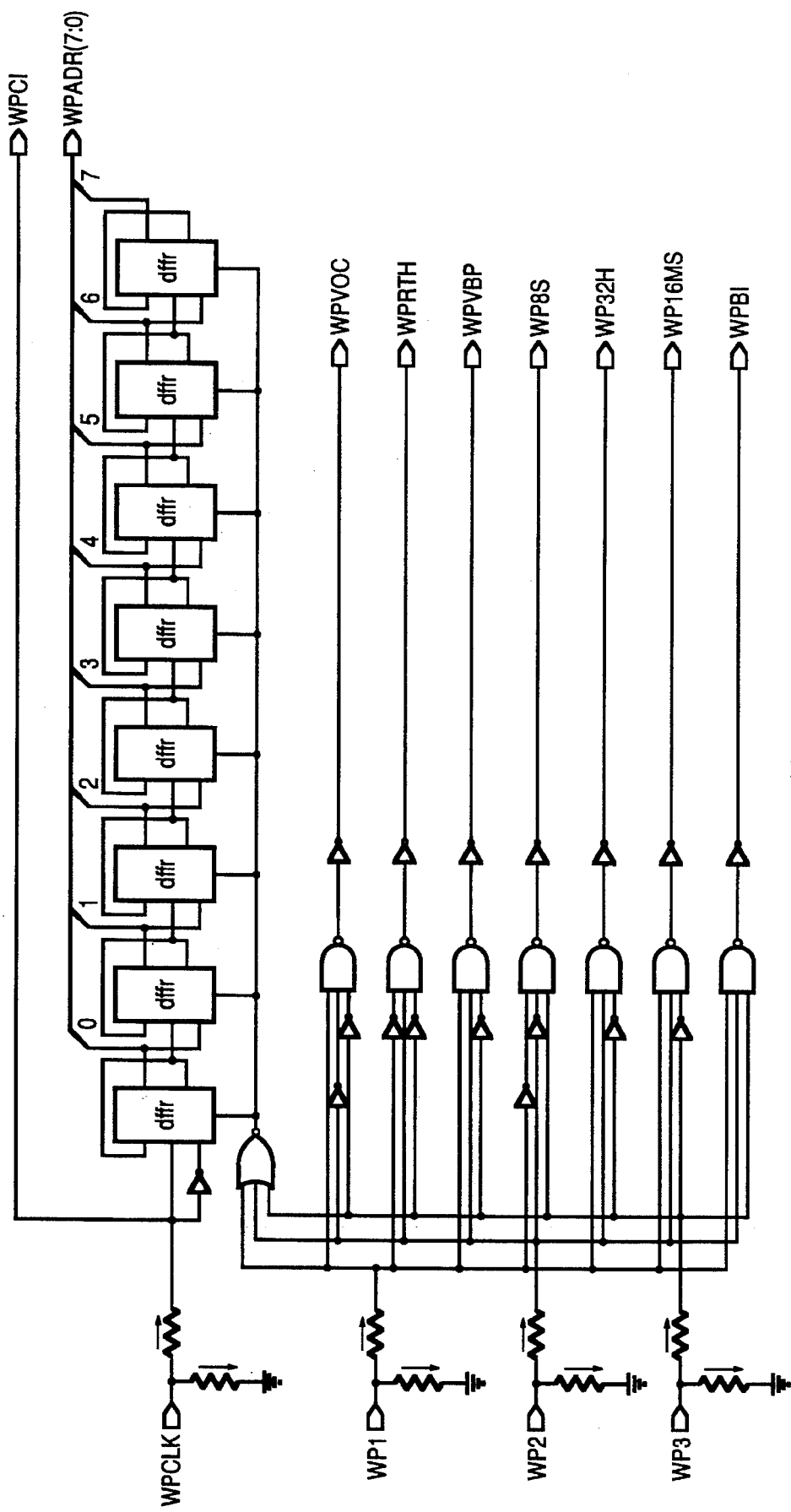

FIG. 14 shows block WPTEST which converts the test pads into usable signals for testing at the wafer level since most voltages and resistances cannot be measured once charger 200 is packaged. WPCLK is the clock to an 8 bit counter to generate the necessary address while WP1, WP2, and WP3 are decoded by a 3 to 8 demux.

After packaging charger 200 must have its precision voltages and resistances trimmed to meet specifications. Trimming and subsequent programming the load line parameters proceeds as shown in flow chart FIG. 9 with input through the one-wire port using VBAT and 28-bit commands. First, load FFFFFF9 (hex) through the one-wire port to nominally set $V_{OC}$ to 4.442 volts and $R_{TH}$ to 5060 ohms. Measure these settings by the voltage at VBAT to check the 4.442 volts and by applying a known voltage at VBAT and measuring the current draw to check the 5060 ohms. Next, load FFFFFFB to check the maximum breakpoint voltage $V_{BP(j)}$ of nominally 4.699 volts at VBAT. Next, load FFFFFFD to have the oscillator drive VBAT at a nominal period of 15.26 microseconds which is measured. Then test for the power fail trip point by forcing VBAT to 0 and adjusting Vdd until the current through VBAT just starts or stops; the nominal Vdd is 4.625 volts. Lastly, after the required trims are computed from the foregoing measurements, the trim bits with a write command are loaded and then programmed into register 33 by then raising the voltage at VBAT to 12 volts for about 200 milliseconds.

Once the trim bits have been stored, charger 200 may be burned in by a power down and power up which will put $V_{OC}$ to 4.442 volts and $R_{TH}$ to 7.5 ohms. Then another VDD up to 8 volts will enable loading and programming of the thirty-two registers with load line parameters. Each 28-bit one-wire word will have three bits indicating the write followed by the 25 bits of load line parameters. At the end of the programming charger 200 will automatically be ready for operation.

To facilitate debugging and failure analysis after programming, the one-wire port can be opened by taking VDD to 8 volts for more than 1 millisecond. This allows the foregoing measurements for trim determination to be repeated with the trimmed values being observed. Further, the values in each register can be read back by loading a 1111 plus 6-bit address. Again, a power down plus power up returns charger 200 to battery charging operation.

Asynchronous Charger

A further preferred embodiment chrager follows the first preferred embodiment except that the comparison of the battery's voltage at VBAT is continuously compared to the breakpoint voltage rather than synchronously with the 8 second cycle. Thus when VBAT (equals or) exceeds the current breakpoint voltage, the charger then reads its memory to load new voltage, resistance, and breakpoint voltage values into the voltage generator, resistor, and digital-to-analog converter and comparator, respectively.

Further Modifications and Variations

The preferred embodiments may be modified in many ways while retaining one of more of the features of a multipart load line battery charger with programmable parameters including in-package testing and trimming.

For example, the memory could be EEPROM or other multi-write memory so that in situ testing and trimming could be performed, other communication protocols could be used, an on-board charge pump could supply the programming high voltage, as so forth.

What is claimed is:

1. A battery charging system, comprising:
   (a) a charging current output terminal having a voltage;
   (b) a variable-voltage generator with an output node;
   (c) a variable resistor; and
   (d) a controller electrically coupled to said variable-voltage generator, to said variable resistor, and to said charging current output terminal, said controller comprising at least one memory for storing ($V_1$, $R_1$, $BP_1$), ($V_2$, $R_2$, $BP_2$), . . . ($V_N$, $R_N$, $BP_N$) where $V_j$ is an output voltage, $R_j$ is a resistance, and $BP_j$ is a breakpoint voltage, wherein j is an index between 1 and n;
   (e) wherein said controller can compare said voltage at said charging current output terminal to said $BP_j$s and when said voltage at said charging current output terminal lies between $BP_{j-1}$ and $BP_j$, said controller can drive said variable-voltage generator to provide said output voltage of $V_j$ at said output node and can drive said variable resistor to provide said resistance of $R_j$ between said output node and said charging current output terminal.

2. The battery charging system of claim 1, further comprising:
   (a) a timer, wherein said timer can periodically drive said controller to compare the voltage at said Charging current output terminal to said $BP_j$s.

3. The battery charging system of claim 2, wherein:
   (a) when driven by said timer said controller successively reads said codes for ($V_j$, $R_j$, $BP_j$) and compares said voltage at said charging current output terminal to $BP_j$ for j equal to n, n–1, . . . , 1 until said voltage at said charging current output terminal is greater than $BP_j$ and then said controller drives said variable voltage generator to provide a voltage of $V_j$ and drives said variable resistor to provide a resistance of $R_j$.

4. The battery charging system of claim 2, wherein:
   (a) said controller comprises a comparator with one input electrically coupled to said charging current output terminal and with another input electrically coupled to a digital-to-analog converter, said controller providing said $BP_j$s to said digital-to-analog converter.

5. The battery charging system of claim 4, further comprising:
   (a) a disconnected-battery detector electrically coupled to said controller, said disconnected-battery detector comprising a second comparator with a first input electrically coupled to said charging current output terminal and a second input electrically coupled to said output node, said second comparator having an offset so that equal voltages at said first and second inputs yield a second comparator output indication of a higher voltage at said first input than at said second input.

6. The battery charging system of claim 1, wherein:
   (a) said variable-voltage generator comprises an operational amplifier and a first voltage divider resistor and a second voltage divider resistor, with a first input of said operational amplifier electrically coupled to a reference voltage, said first voltage divider resistor electrically coupled between a second input of said operational amplifier and a ground node, and said second voltage divider resistor electrically coupled between said second input and said output node, said operational amplifier having an output and a gain;

(b) said first voltage divider resistor is comprised of a fixed resistor in series with a first trim resistor; and (c) said second voltage divider resistor is comprised of a second variable resistor in series with a second trim resistor, wherein $V_j$ applied to said variable resistor sets said gain of said operational amplifier to provide $V_j$ at said output node.

7. The battery charging system of claim 6, wherein:

(a) said first trim resistor having a first resistance and said second trim resistor having a second resistance, further wherein said first resistance and said second resistance combine to form a sum of resistance;

(b) said memory stores a trim T, said trim T applied to said first trim resistor and said second trim resistor to adjust the first resistance of said first voltage divider resistor and said second resistance of said second voltage divider resistor while keeping said sum of resistances remaining constant.

8. The battery charging system of claim 6, wherein:

(a) the output of said operational amplifier drives a gate of a field effect transistor electrically coupled between a power supply and said output node.

9. The battery charging system of claim 8, wherein:

(a) said variable resistor is comprised of at least one component grouping with each of said at least one component grouping comprising
 (1) at least one resistor electrically coupled between said charging current output terminal and a first node and
 (2) at least one field effect transistor electrically coupled between said power supply and said first node, each of said at least one field effect transistor having a corresponding gate;

(b) wherein $R_j$ applied to said variable resistor couples one or more of said at least one component groupings to said variable-voltage generator with said output of said operational amplifier electrically coupled to said corresponding gate of said at least one field effect transistor of said at least one field effect transistor and with the output node electrically coupled to said first node.

10. The battery charging system of claim 9, wherein:

(a) said variable resistor includes an adder and a decoder;

(b) said memory stores code for a component grouping trim S, wherein said adder adds said code for a component grouping trim S to said code for $R_j$ to yield a selection sum for said component grouping, and said decoder decodes said selection sum to couple said one or more of said component groupings to said variable-voltage generator.

11. A programmable battery charging system, comprising:

(a) a charging current output terminal;

(b) a voltage generator, said voltage generator with an output node at voltage V selectable from a set of voltages $V_1, V_2, \ldots V_N$;

(c) a resistor electrically coupled between said output node and said charging current output terminal, said resistor with a resistance, R, selectable from a set of resistances $R_1, R_2, \ldots R_M$;

(d) a comparator with one input electrically coupled to said charging current output terminal and one input coupled to a breakpoint generator, said breakpoint generator with an output breakpoint voltage BP selectable from a set of breakpoint voltages $BP_1, BP_2, \ldots BP_K$;

(e) a controller comprising a memory, said memory programmable to store a plurality of triples $(V_j, R_j, BP_j)$ where $V_j$ is selected from $V_1, V_2, \ldots V_N$, $R_j$ is selected from $R_1, R_2, \ldots R_M$, and $BP_j$ is selected from $BP_1, BP_2, \ldots BP_K$;

(f) said controller is electrically coupled to said voltage generator, to said resistor, to said comparator, and to said breakpoint generator, wherein said controller can
 (1) determine $BP_j$, said $BP_j$ is the smallest $BP_j$ stored in said memory and which is greater than the voltage at said charging current output terminal, by providing stored $BP_j$s to said breakpoint generator and sensing the output of said comparator, and wherein said controller can
 (2) adjust said output breakpoint voltage and said resistance by providing $V_j$ and $R_j$ to said voltage generator and said resistor, respectively.

12. The programmable battery charging system of claim 11, wherein:

(a) said memory is an erasable programmable read only memory; and (b) said plurality of triples $(V_j, R_j, BP_j)$ are stored in said erasable programmable read only memory in coded form.

13. The programmable battery charging system of claim 11, wherein:

(a) said memory can be programmed by access at said output terminal, said output terminal also provides for one-wire communication.

14. The programmable battery charging system of claim 11, wherein:

(a) said voltage generator is comprised of an operational amplifier and first and second voltage divider resistors, with a first input of said operational amplifier electrically coupled to a reference voltage, said first voltage divider resistor electrically coupled between a second input of said operational amplifier and a ground node, and said second voltage divider resistor electrically coupled between said second input and said output node;

(b) said first voltage divider resistor is comprised of a fixed resistor in series with a first trim resistor;

(c) said second voltage divider resistor is comprised of a variable resistor in series with a second trim resistor, wherein $V_j$ applied to said variable resistor sets a gain of said operational amplifier to provide $V_j$ at said output node; and (d) said memory programmable to store a trim T, said trim T applied to said first and second trim resistors adjusts resistances of said first and second trim resistors with the sum of the resistances remaining constant.

15. The programmable battery charging system of claim 14, wherein:

(a) said second voltage divider resistor is comprised of at least one component grouping with each of said at least one component grouping comprising
 (1) at least one feedback resistor electrically coupled between said charging current output terminal and a first node and
 (2) at least one field effect transistor electrically coupled between a power supply and said first node, each at least one field effect transistor having a corresponding gate;

(b) wherein $R_j$ configures said second voltage divider resistor by coupling one or more of said at least one component groupings to said voltage generator with the output of said operational amplifier electrically coupled to said corresponding gate of said at least one field effect transistor and with said output node electrically coupled to said first node.

16. The programmable battery charging system of claim 15, wherein:

(a) said feedback resistor is comprised of an adder and a decoder;

(b) said memory programmable to store code for a component grouping trim S, wherein said adder adds said code for a component grouping trim S to $R_j$ to yield a component grouping selection sum, and said decoder decodes said component grouping selection sum to couple said one or more of said at least one component grouping to said voltage generator.

17. A method of battery charging, comprising the steps of:

(a) providing a plurality of $(V_j, R_j, BP_j)$ where $V_j$ is a charging voltage for j, $R_j$ is a series resistance for j, and $BP_j$ is a breakpoint voltage for j, wherein j is an index number in a series of said index numbers, so that j+1 is the next index number in said series of said index numbers;

(b) sensing a voltage on a battery;

(c) applying said voltage $V_j$ in series with said series resistance $R_j$ to said battery when said voltage on said battery lies between $BP_j$ and $BP_{j+1}$.

18. The method of battery charging of Claim 17, further comprising the step of (d) repeating steps (b)–(c) with $(V_j, R_j, BP_j)$ until said voltage on said battery is above $BP_{j+1}$.

19. The method of battery charging of claim 17, wherein said battery is NiCd.

20. The battery charging system of Claim 1, wherein said system charges a NiCad battery.

* * * * *